US008762221B2

(12) United States Patent
Chatter et al.

(10) Patent No.: US 8,762,221 B2
(45) Date of Patent: Jun. 24, 2014

(54) IMPLEMENTING AUCTIONS ON SOCIAL NETWORK PLATFORMS

(76) Inventors: Mukesh Chatter, Concord, MA (US);
Rohit Goyal, Cambridge, MA (US);
Priti Chatter, Burlington, MA (US);
Shiao-Bin Soong, Littleton, MA (US)

(*) Notice: Subject to any disclaimer, the term of this patent is extended or adjusted under 35 U.S.C. 154(b) by 476 days.

(21) Appl. No.: 12/948,311

(22) Filed: Nov. 17, 2010

(65) Prior Publication Data

US 2011/0125605 A1 May 26, 2011

Related U.S. Application Data

(60) Provisional application No. 61/261,997, filed on Nov. 17, 2009, provisional application No. 61/266,800, filed on Dec. 4, 2009.

(51) Int. Cl.
*G06Q 30/00* (2012.01)

(52) U.S. Cl.
USPC .......................................... 705/26.3; 705/319

(58) Field of Classification Search
USPC .......................................... 705/26–27.2, 319
See application file for complete search history.

(56) References Cited

U.S. PATENT DOCUMENTS

| 7,778,882 | B2* | 8/2010 | Chatter et al. ............... 705/26.3 |
| 7,895,116 | B2* | 2/2011 | Chatter et al. ............... 705/37 |
| 2001/0042041 | A1* | 11/2001 | Moshal et al. ............... 705/37 |
| 2002/0165817 | A1* | 11/2002 | Rackson et al. ............... 705/37 |
| 2007/0208630 | A1* | 9/2007 | Chatter et al. ............... 705/26 |
| 2009/0030829 | A1* | 1/2009 | Chatter et al. ............... 705/37 |
| 2009/0307073 | A1* | 12/2009 | MirrokniBanadaki et al. ............... 705/14.25 |

OTHER PUBLICATIONS

Delivery Social Network with Mobile Location-Based Courier, Taxi, and Limo Marketplace Announced. PR Newswire, Dec. 20, 2007.*

* cited by examiner

*Primary Examiner* — Adam Levine
(74) *Attorney, Agent, or Firm* — Clock Tower Law Group; Erik J. Heels; Michael A. Bartley

(57) ABSTRACT

A system platform and associated methods are provided for implementing online reverse auctions in a social network platform (SNP). A fully-automated, live, reverse-auction based system is integrated into an SNP to enable buyers to initiate desired transactions and take advantage of a subscribers' network of friends, colleagues, co-workers, family members and connections by connecting buyers and sellers in a non-intrusive, targeted fashion. Sellers compete for buyers' business by providing dynamic, real-time seller-specific pricing while simultaneously optimizing the seller's target parameters such as price, inventory levels, profit, revenue and volume.

75 Claims, 19 Drawing Sheets

| PRIMARY DEALS | ITEM ID | ITEM DESCRIPTION | DEAL VALIDITY DURATION | NUMBER OF UNITS AVAILABLE | REVIEW / COMMENTS |
|---|---|---|---|---|---|
| | | | | | |
| | | | | | |
| | | | | | |
| | | | | | |
| | | | | | |

| SECONDARY DEALS | ITEM ID | ITEM DESCRIPTION | DEAL VALIDITY DURATION | NUMBER OF UNITS AVAILABLE | DEAL INITIATOR | REVIEW / COMMENTS |
|---|---|---|---|---|---|---|
| | | | | | | |
| | | | | | | |
| | | | | | | |
| | | | | | | |

FIG. 8

IMPLEMENTING AUCTIONS ON SOCIAL NETWORK PLATFORMS

CROSS-REFERENCE TO RELATED APPLICATIONS

This application claims priority to and the benefit of U.S. provisional patent application Ser. Nos. 61/261,997, filed Nov. 17, 2009, and 61/266,800, filed Dec. 4, 2009, each entitled "Auctions in a Social Networking Framework."

TECHNICAL FIELD

This invention relates to computer-based methods and systems for implementing online auctions, and more specifically to computer-aided techniques for implementing and executing online auctions within social network platforms.

BACKGROUND INFORMATION

On-line social networks strive to enroll as many members as possible. In most social networks, each member defines her own group of friends by compiling a list of friends or colleagues. Each individual typically has the ability to define the parameters governing her community of friends, such as who she wants to interact with, who she shares information with, who has access to her personal data and who to request as a friend or connection. Facebook, LinkedIn, MySpace and Orkut are examples of such social networks. Each person in a member's group of friends typically has her own set of friends, some of whom may overlap with others, and some which do not. Thus an individual and her group of friends (collectively referred in this document as a "micro-community") can be unique to each individual. As a result, a social networking site may consist of millions of micro-communities, each of varying size and characteristics.

Membership is typically free at these sites, and advertisements and pay-to-participate games and applications are commonly used to monetize the sites. In some cases, a marketplace may also be provided to facilitate trading and commerce among sellers and subscribers. Such transactions are not conducted any differently than conventional online transactions, and are not unique to the social network construct.

While some on-line social networking sites may have upwards of 250 million users, these platform providers have not succeeded in monetizing this substantial traffic apart from conventional advertising. In fact, even the most successful sites (in terms of membership, page views, etc.) are still struggling to attain a break-even cash flow. Some of the challenges to monetize the subscriber base and traffic on these social networking platforms ("SNPs") are summarized below in the context of the SNPs themselves, the subscribers (or members), and those looking to sell their products or services on the sites ("sellers").

From the perspective of the SNPs, subscribers are inherently more demanding of privacy and place a premium on it thus limiting the aggressive advertising opportunities. Thus, gaining and maintaining subscribers' trust is very important and aggressive attempts to push products or services by those outside a subscribers micro-community encounters a high degree of skepticism and resistance. Moreover, the lack of transparency associated with on-line marketing and behavioral advertising push erodes trust and is generally not accepted by subscriber bases. In addition, the content and dialog on SNPs tends to be more social and less commercial such that conventional social etiquettes adhered to in personal interactions lead to diminished attention to or tolerance of commercial messages. Regarding applications implemented on SNPs, the SNPs receive little or no compensation for the use of applications developed for their platforms. These factors, and others, have made it difficult for SNPs to capitalize on the high trust inherent within a subscriber's micro-communities and translate it into a revenue opportunity or derive any benefit from activities and shared knowledge or habits of subscribers within a particular micro-community.

From the perspective of the subscribers, there is an inherent trust among members of her micro-community that is far greater than an outside advertiser, and members of a micro-community are often interested in similar products or services and share their experiences. While group buying sites like BuyWithMe and GroupOn allow for community buying, subscribers are more apt to share their experiences with members of their micro-community and trust recommendations and reviews from others in their community, as opposed to the general public. Moreover, the "deals" that are available on conventional group buy sites are determined by the merchants and the sites themselves (e.g., the "deal of the day") as opposed to deals that are initiated and defined by members of the community itself. As such, subscribers cannot initiate a transaction for the products and/or services she desires when she needs it.

From the perspective of the sellers, conventional advertisements targeted at a micro-community are not effective because aggressive attempts to push products and services by those outside one's own unique micro-community encounters higher degree of skepticism and resistance. A lack of transparency associated with aggressive marketing/advertising push is generally not accepted by the subscriber base and the ROI for this type of online ad spending is questionable. Furthermore, sellers have no way to reach members of a micro-community if one member of that community had a positive interaction with an ad.

Therefore, what is needed is a new approach online advertising and selling products and services that takes advantage of the micro-communities inherent in social networks.

SUMMARY

Embodiments of the invention provides a novel system platform and technique for implementing online auctions in a social network platform (SNP). A fully-automated, live, reverse-auction based system is integrated into an SNP to enable buyers to initiate desired transactions at will and to take advantage of a subscribers' network of friends, colleagues, co-workers, family members and connections (commonly referred-to herein as a subscribers' "micro-community") by connecting buyers and sellers in a non-intrusive, targeted fashion. Sellers can compete for buyers' business by providing dynamic, real-time seller-specific pricing while simultaneously optimizing the seller's target parameters such as price, inventory levels, profit, revenue and volume, all at customer acquisition costs significantly lower than conventional targeted advertising methods. Subscribers have access to their own unique "boards"—online screens or dashboards—that display real-time auction and transaction information across the entire platform. Through these dashboards, subscribers can view deals as they propagate through the SNP, providing opportunities for the SNP provider, brands and other commercial enterprises to display ads and other revenue-generating content to the subscribers.

Accordingly, in a first aspect, a computerized method for providing an online reverse auction within a social network platform includes the following processes and functions. At an application server, an electronic message including initial auction parameters of a desired purchase is received from a subscriber to a social network platform. Based on the initial parameters, an auction controller calculates auction parameters and provides the auction parameters to a set of automated auction engines, each being associate with a seller capable of fulfilling the purchase. Offers to fulfill the desired purchase for the subscriber are received from the auction engines in an iterative fashion, where each iteration includes programmatically-calculated updated auction parameters that are increasingly favorable to the subscriber. This continues until a single seller has provided a most favorable set of auction parameters. The most favorable auction parameters are distributed over an electronic network to additional subscribers of the social network platform, thus allowing the additional subscribers to complete a purchase using these same auction parameters.

The initial parameters may include parameters such as a description of an item or service that the subscriber desires to purchase, a quantity of the item, a desired class of seller (based, for example, on customer reviews, satisfaction ratings, industry ratings, etc.), delivery options and/or a return policy. In certain embodiments, the duration during which the additional subscribers may take advantage of the most favorable parameters and complete a subsequent transaction is limited. In other cases, the subsequent transactions may be limited based on inventory levels of the sellers. It may be limited, for example, by the seller, or, in some cases, a system parameter. The updated auction parameters may include a price at which the sellers are willing to fulfill the desired purchase, as well as modifications to one or more of the initial parameters. During each iteration each of the sellers revises its respective updated auction parameters based on a seller-specific objective function. The objective function may be constrained by a number of seller-specific parameters such as an actual or desired inventory level, profit and revenue targets, supplier's breaks, customer acquisition cost, advertising and promotion costs, some of which may change over time.

In some embodiments, the auction engines may alter the duration that the transaction is available to additional subscribers, and/or the number of units that particular seller is willing to allocate to the transactions. Such alterations may be based, for example, on the number of additional subscribers joining the transaction, or other transactions in which the same seller is participating, all constrained by the seller's unique targets. In addition to optimization of the seller's unique targets (such as monthly profit, revenue, inventory, supplier's break, promotion cost, advertising cost etc.) while computing price for a specific transaction, factors taken into consideration may also include an aggregated amount of deal validity duration left across all transactions in which the seller is participating, cumulative conversion rates achieved across all transactions, variance from expected conversion rates as a function of time, and the total number of units sold. This analysis may be performed across multiple independently initiated transactions for the same product, across product lines from the same manufacturer, and across different manufacturers.

Consumer profiles may be derived for subscribers to the social network platform. The profiles may be based on consumer demographic and/or behavioral traits such as age, income, gender, education, location, historical purchase patterns, expected conversion rates, size of the subscribers community within the social network platform, activity level within the platform, as well as others. The profile may also be used as input into the objective function, further influencing the seller's objective function and, as a result, the updated auction parameters.

The additional subscribers may, in some instances, be members of the subscriber's community within the social network platform. The community may include additional subscribers that are one, two or even more degrees of separate from the subscriber. In some cases, the degree of separation may be configurable and/or selectable by the subscriber. The subscribers may also utilize a filtering function that facilitates searching across all potential purchases according to one or more of the auction parameters, and, in some cases, permits additional subscribers not connected to the subscriber to participate in the transaction.

Information about the transaction may be presented to the subscriber and the additional subscribers using an electronically renderable "dashboard" or screen that may, in different forms, include the initial auction parameters, the updated auction parameters, and/or the most favorable set of auction parameters. The screen may be propagated to additional subscribers based on a traversal of connections within the social network platform until a stopping criteria is met, such as the expiration of a deal duration, depletion of inventory, propagation to a maximum number of subscribers etc.

In some embodiments the most favorable set of auction parameters are not sent to the additional subscribers until the subscriber has completed a transaction at the same parameters. In such cases, the application server may also receive messages from the subscriber and/or the additional subscribers indicating a desire to complete a transaction based on the most favorable set of auction parameters.

In another aspect, a computerized method for facilitating the sale of goods to subscribers to a social network platform includes the following processes and functions. Parameters of a completed transaction between a subscriber to the platform and a seller are electronically propagated by an application server to additional subscribers to the platform. The additional subscribers are members of the subscriber's community—e.g., they are connected to the subscriber by one, two or more degrees of separation. At the application server, indications of interest in completing subsequent transactions are received from the additional subscribers, and, upon such receipt, the seller iteratively determines whether they can fulfill each subsequent transaction based on the parameters of the completed transaction, as well as their seller-specific objective function as constrained by various seller-specific parameters, such as an actual or desired inventory level, number of additional subscribers requesting to take part in the transaction, revenue and profit targets, seller's break levels, as well as others.

In some cases, the iterative determination occurs after receiving each indication of interest. In other cases, the iterations occur after receiving a group of indications of interest (e.g., after every ten requests to join the transaction), which may, in some cases, when aggregated together, exceed one or more of the seller-specific parameters such that the seller can no longer fulfill the subsequent requests.

Consumer profiles may be derived for subscribers to the social network platform. The profiles may be based on consumer demographic and/or behavioral traits such as age, income, gender, education, location, historical purchase patterns, expected conversion rates, size of the subscribers community within the social network platform, activity level within the platform, as well as others. The profile may also be used as input into the objective function, further influencing the seller's objective function and, as a result, the updated auction parameters.

The additional subscribers may, in some instances, be members of the subscriber's community within the social network platform. The community may include additional subscribers that are one, two or even more degrees of separate from the subscriber. In some cases, the degree of separation may be configurable and/or selectable by the subscriber. The subscribers may also utilize a filtering function that facilitates searching across all potential purchases according to one or more of the auction parameters, and, in some cases, permits additional subscribers not connected to the subscriber to participate in the transaction.

For each iteration, the auction engine can compute dynamic pricing by optimizing the seller's objective function based on the seller's unique targets. The optimization may also consider the number of additional subscribers who have joined the transaction, the total volume requested, how many times the commitment price has been met, the difference between commitment price and the dream price, a profile of each community and their respective expected conversion rate, and blended community profiles derived from the subscribers. In some embodiments, each auction engine scans the dream prices across various proposed transactions for the same product and performs real-time optimized pricing computation taking each transaction into consideration, and subsequently decides to proceed or not. Additional consideration may also include scanning transactions for different products. In some cases, the group of subscribers can pre-form (prior to any initial auction by a single subscriber) and initiate the process as a group instead of triggering subsequent iterations as each additional subscriber joins.

Information about the transaction may be presented to the subscriber and the additional subscribers using an electronically renderable "dashboard" or screen that may, in different forms, include the initial auction parameters, the updated auction parameters, and/or the most favorable set of auction parameters. The screen may be propagated to additional subscribers based on a traversal of connections within the social network platform until a stopping criteria is met, such as the expiration of a deal duration, depletion of inventory, propagation to a maximum number of subscribers etc.

The process may repeat iteratively after each completed subsequent transaction. As a result, each additional subscriber replaces the subscriber in the process, thus propagating the parameters of the completed subsequent transactions between the seller and the additional subscribers to subsequent subscribers, each subsequent subscriber being a member of one of the additional subscriber's community within the social network platform. In such cases, certain auction parameters may change as the transaction propagates to subsequent subscribers, based on the seller's ability to meet the terms of the transaction and still satisfy his seller-specific objectives.

After the final iteration is completed for the group, the final group price may be offered to each subscriber's community, along with the available inventory and deal validity duration. In such cases, each auction engine computes number of units to be offered and corresponding deal validity duration by optimizing inventory, profit, revenue, supplier's break, acquisition cost and other such seller targets, in conjunction with additional factors such as community profile of each of the corresponding subscriber in the group and their respective expected conversion rate. Each additional transaction may, in turn, result in subsequent propagation to the additional subscribers.

In some cases, the seller may also consider the effects of multiple, independent transactions initiated by different subscribers when determining his optimal bid. The independent transactions may be for the same or similar products, or, in some cases, cross product lines or even suppliers.

In yet another aspect, a computerized method for facilitating the sales of goods to subscribers to a social network platform includes the following processes. An electronic message is received at an application server, the message being from a subscriber to a social network platform and including desired auction parameters of a proposed purchase of an item and a final auction time. The desired auction parameters are transmitted over an electronic network to an initial set of automated auction engines, each of which is associated with a respective seller. Offers to fulfill the proposed purchase are iteratively received from some of the initial set of auction engines, wherein each iteration comprises programmatically-calculated updated auction parameters increasingly favorable to the subscriber until at least one engine has provided a set of auction parameters. The set of auction parameters are transmitted to additional subscribers to the social network platform, thus allowing the additional subscribers to respond with respective indications of interest in joining the proposed purchase. Upon receiving indications of interest from the subset of the additional subscribers, an updated set of automated auction engines, each being associated with a respective seller, is notified of the indications of interest to join the proposed purchase. In response offers are received from the updated set of auction engines to fulfill the proposed purchase, wherein each iteration includes programmatically-calculated interim auction parameters increasingly favorable to the additional subscribers and satisfying a seller-specific objective function constrained by one or more seller-specific parameters, until a stopping criteria is met.

Examples of seller-specific parameters include, but not necessarily limited to an actual or desired inventory level, supplier break points, a revenue target and/or a profit target, actual revenue, actual profit, customer acquisition costs, etc. In some cases, the seller-specific objective function is further constrained by the number of received indications of interest to join the proposed purchase.

The stopping criteria may be, for example, reaching the final auction time or reaching a "dream price"—a price at which the subscriber noted she would definitely complete the transaction. In some cases, the dream price is included in the desired auction parameters and provided to the auction engines, whereas in other cases it remains hidden from the auction engines. The auction parameters (including the desired parameters) may also include a commitment price, at which any subscriber (including a subsequent subscriber) expressing interest in the transaction is bound to complete the transaction if the final price is at or below the commitment price.

The auction parameters may include, as examples, a description of the item to be purchased, a quantity of the item to be purchased, a number of the additional subscribers that may join the proposed purchase, recent price data for similar products, desired characteristics of the additional subscribers that may join the proposed purchase, a desired class of seller, delivery options and a return policy.

In some cases, the transactions may be consummated between a seller associated with the winning auction engine and the subset of the additional subscribers according to a final set of auction parameters, where the final set of auction parameters is the most favorable set of parameters to the additional subscribers offered by one of the updated set of auction engines. Notification to the updated set of automated auction engines may occur after receipt of each indication of interest to join the purchase, or in some cases, after receipt of a predefined number of indications of interest to join the purchase.

Consumer profiles may be derived for subscribers to the social network platform. The profiles may be based on consumer demographic and/or behavioral traits such as age, income, gender, education, location, historical purchase patterns, expected conversion rates, size of the subscribers community within the social network platform, activity level within the platform, as well as others. The profile may also be used as input into the objective function, further influencing the seller's objective function and, as a result, the updated auction parameters. In some instances, a community profile may be derived by aggregating and/or averaging certain aspects of individual profiles such that an entire community's profile influences the seller's objective function.

The additional subscribers may, in some instances, be members of the subscriber's community within the social network platform. The community may include additional subscribers that are one, two or even more degrees of separate from the subscriber. In some cases, the degree of separation may be configurable and/or selectable by the subscriber. The subscribers may also utilize a filtering function that facilitates searching across all potential purchases according to one or more of the auction parameters, and, in some cases, permits additional subscribers not connected to the subscriber to participate in the transaction.

Information about the transaction may be presented to the subscriber and the additional subscribers using an electronically renderable "dashboard" or screen that may, in different forms, include the initial auction parameters, the updated auction parameters, and/or the most favorable set of auction parameters. The screen may be propagated to additional subscribers based on a traversal of connections within the social network platform until a stopping criteria is met, such as the expiration of a deal duration, depletion of inventory, propagation to a maximum number of subscribers etc.

In another aspect, a system for facilitating an online reverse auction within a social network platform includes multiple auction engines, each auction engine being associated with a potential seller of goods or services and an application server, which in turn includes an auction controller and communication server in communication with the auction engines over an electronic network. The communication server is configured to receive an electronic message from a subscriber to a social network platform that includes initial auction parameters of a desired purchase and provide the initial auction parameters to the auction engines. The communication server is also configured to iteratively receive offers to fulfill the desired purchase for the subscriber from the auction engines. Each iteration comprises programmatically-calculated updated auction parameters increasingly favorable to the subscriber until a single auction engine has provided a most favorable set of auction parameters. The communication server also distributes over the electronic network the most favorable set of auction parameters to additional subscribers of the social network platform, thus allowing the additional subscribers to complete a purchase according to the most favorable set of auction parameters. The auction controller is configured to determine the additional subscribers of the social network platform to whom the most favorable set of auction parameters are to be distributed.

In some embodiments, the communication server also receives a message from the subscriber and/or additional subscribers indicating a desire to complete the desired purchase at the most favorable set of auction parameters. The auction controller may also be configured to limit the duration during which the additional subscribers may complete the purchase, and, in some cases, determine the additional subscribers to which the most favorable set of auction parameters are to be distributed by traversing relationships among subscribers to the social network platform. For example, the auction controller may limit the degree of separation between the subscriber and the additional subscribers.

In some implementations of the system, the auction engines are configured to iteratively revise their respective updated auction parameters based on a seller-specific objective function which is constrained by seller-specific parameters such as an actual or desired inventory level, supplier break, revenue target and/or profit target. Further, the communication server may access and provide consumer profiles (of the subscriber and/or the additional subscribers) to the auction engines such that the programmatically-calculated updated auction parameters are based, at least in part, on the consumer profiles, which may include the subscriber's age, income, gender, education, location, historical purchase patterns, sales conversion rate, customer acquisition cost and activity level within the social network platform. In some instances, a community profile may be derived by aggregating and/or averaging certain aspects of individual profiles such that an entire community's profile influences the seller's objective function.

The communications server may also be configured to provide to the subscriber and each of the additional subscribers an electronically rendered screen that includes the initial auction parameters, the auction parameters, the updated auction parameters and/or the most favorable set of auction parameters.

In yet another aspect, a system for facilitating sales of goods to subscribers to a social network platform includes an application server and multiple automated auction engines, each of which is associated with a respective seller. The application server is configured to receive an electronic message from a subscriber to a social network platform that includes desired auction parameters of a proposed purchase of an item, including a final auction time and provide the desired auction parameters to an initial set of the automated auction engines. The application server iteratively receives offers to fulfill the proposed purchase from the auction engines, wherein each iteration comprises programmatically-calculated updated auction parameters increasingly favorable to the subscriber until at least one engine has provided a set of auction parameters. The set of auction parameters are distributed over an electronic network to additional subscribers to the social network platform, thus allowing the additional subscribers to respond with respective indications of interest in joining the proposed purchase. The application server receives indications of interest to join the proposed purchase from at least a subset of the additional subscribers, and upon receipt of the indications of interest from the subset of the additional subscribers notifies an updated set of automated auction engines of the indications of interest to join the proposed purchase. The server iteratively receives offers to fulfill the proposed purchase from an updated set of auction engines, wherein each iteration comprises programmatically-calculated interim auction parameters increasingly favorable to the additional subscribers and satisfying a sell-specific objective function constrained by one or more seller-specific parameters, until a stopping criteria is met. The application server then identifies a winning auction engine based on the received offers.

In another aspect, a hardware apparatus architected for facilitating an online reverse auction within a social network platform includes a cell memory, a rules memory, a controller and a processor. The cell memory includes grouped memory addresses, each grouping representing a subscriber to a social network and storing information describing potential purchases available to and/or initiated by the subscriber. The rules memory is configured to store instructions for implementing rules governing the propagation and updating of information stored in the cell memory. The controller reads information from the cell memory and rules memory and apply the rules to the information, and the processor configures the cell memory and rules memory.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 8 illustrates one example of a deal board according to various embodiments of the invention.

DETAILED DESCRIPTION

Figure 1:
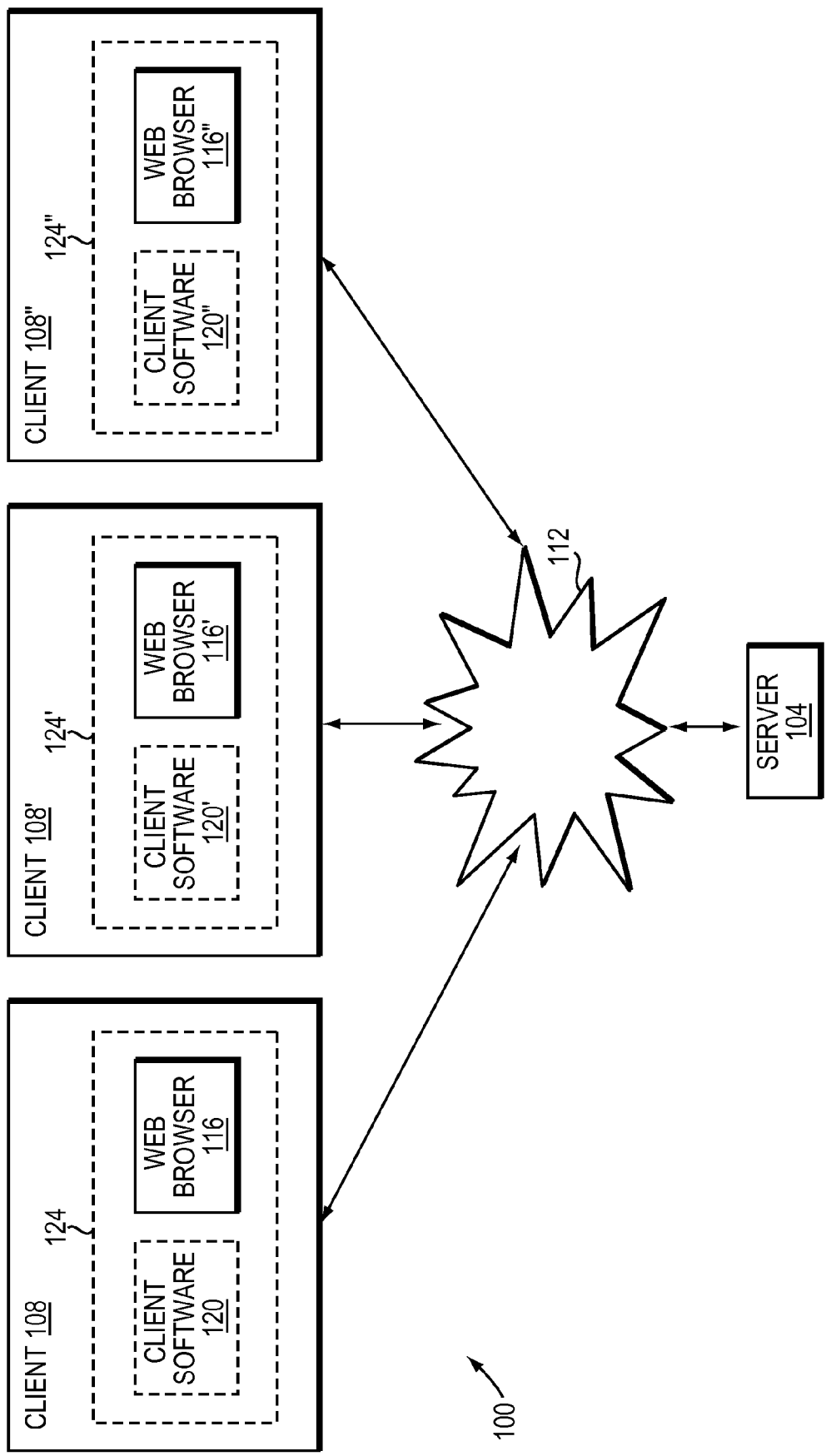
FIG. 1 is a block diagram of an embodiment of an online reverse auction environment according to various embodiments of the invention.

Referring to FIG. 1, in one embodiment, a reverse-auction system 100 for implementation into or with a social networking platform (SNP) includes at least one auction server 104, and at least one client 108, 108', 108", generally 108. As shown, the reverse-auction system 100 includes three clients 108, 108', 108", but this is only for exemplary purposes, and it is intended that there can be any number of clients 108. The client 108 is preferably a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C., ANDROID from GOOGLE INC. of Mountain View, Calif. (and others). The client 108 may also be implemented on such hardware as a smart or dumb terminal, network computer, wireless device, cellular or smartphone, tablet PC, information appliance, workstation, minicomputer, mainframe computer, or other computing device, that is operated as a general purpose computer or a special purpose hardware device used for serving as a client 108 to access and use the SNP and system 100.

Generally, clients 108 are operated and used by consumers to participate in the social network platform such as FACEBOOK, MySpace, and others. In some implementations, the clients 108 may use other websites and web-based applications to access the system. In various embodiments, the client computer 108 includes either a web browser 116, client software 120, or both. The web browser 116 allows the client 108 to request a web page (e.g. from the server 104) with a web page request. An example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 108 manually requests a web page from the server 104. Alternatively, the client 108 automatically makes requests with the web browser 116. Examples of commercially available web browser software 116 are INTERNET EXPLORER, offered by Microsoft Corporation of Redmond, Wash., and FIREFOX, offered by the Mozilla Foundation.

In some embodiments, the client 108 also includes a client software module 120. In certain instances, the client software 120 provides functionality to the client 108 that allows the consumer to participate in an auction with other consumers using the SNP. The client software 120 may be implemented in various forms, for example, it may be in the form of a Java applet that is downloaded to the client 108 and runs in conjunction with the web browser 116, or the client software 120 may be in the form of a standalone application, implemented in a multi-platform language such as Java or in native processor executable code. In one embodiment, if executing on the client 108, the client software 120 opens a network connection to the server 104 over the communications network 112 and communicates via that connection to the server 104. The client software 120 and the web browser 116 may be part of a single client-server interface 124; for example, the client software can be implemented as a "plug-in" to the web browser 116.

A communications network 112 connects the client 108 with the server 104. The communication may take place via any media such as standard telephone lines, LAN or WAN links (e.g., T1, T3, 56 kb, X.25), broadband connections (ISDN, Frame Relay, ATM), wireless links, cellular networks, and so on. Preferably, the network 112 can carry TCP/IP protocol communications, and HTTP/HTTPS requests made by the web browser 116 and the connection between the client software 120 and the server 104 can be communicated over such TCP/IP networks. The type of network is not a limitation, however, and any suitable network may be used. Typical examples of networks that can serve as the communications network 112 include a wireless or wired Ethernet-based intranet, a local or wide-area network (LAN or WAN), and/or the global communications network known as the Internet, which may accommodate many different communications media and protocols.

The auction server 104 may be operated by the same entity operating the SNP, or, in some embodiments, by a third-party application host offering the auction service to one or more SNPs. The auction server 104 is preferably implemented on one or more server class computers that have sufficient memory, data storage, and processing power and that run a server class operating system (e.g. SUN Solaris, GNU/Linux, MICROSOFT WINDOWS, etc.). Other types of system hardware and software than that described here may also be used, depending on the capacity of the device and the number of consumers using the auction services and the number of SNPs being supported. For example, the server 104 may be part of a server farm or server network, which is a logical group of one or more servers. As another example, multiple servers 104 may be associated or connected with each other or operating independently, but with shared data. As is typical in large-scale systems, application software implementing the functions and features described herein may be implemented in components, with different components running on different server computers, on the same server, or some combination.

Figure 2:
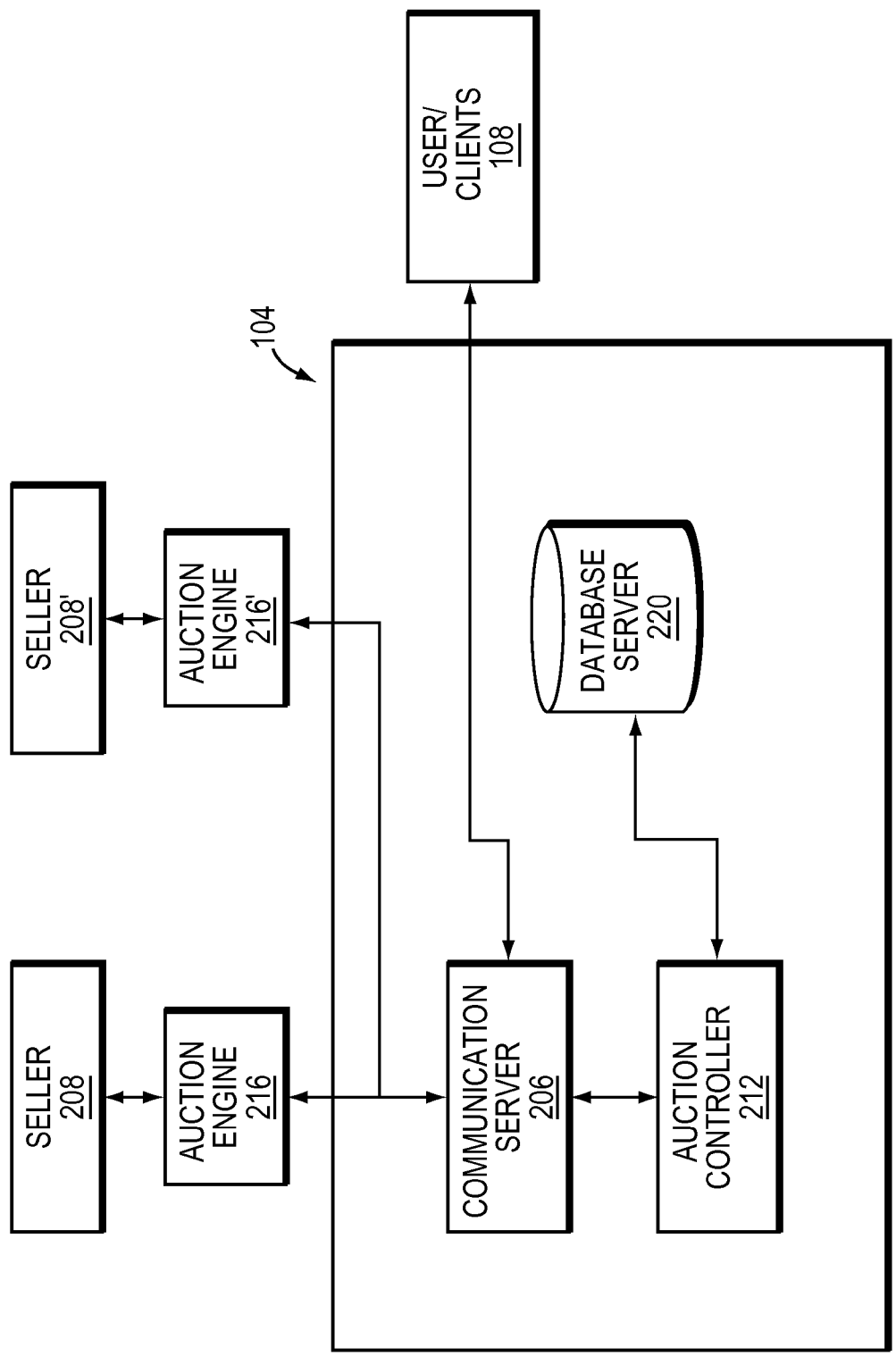
FIG. 2 is a block diagram of an embodiment of a server in the auction system of FIG. 1.

Referring to FIG. 2, in one embodiment, the auction server 104 includes a client communication module 206 that is the interface for communication with clients 108 and sellers 208. As used herein, sellers 208 may be any type of entity, including, but not limited to large retail chains (e.g., BestBuy, J&R Electronics, RadioShack, etc.), regional or local stores, restaurants, and even individuals. Typically, sellers 208 also communicate with the system using one or more clients 108 via the network 112. The client communication module 206 can be implemented as software running on one or more servers, or may be implemented as a stand-alone server. In some embodiments, the client communication module 206 can provide an interface both to client software 120 and to a client web browser 116, so that, for example, a web browser 116 can be used by a consumer to access their auction information, or to observe the progress of other auctions, and so on, while the client software 120 may be used for participating in an auction. The interface to each of the client software 120 and the client web browser 116 can be implemented separately or in combination. In other embodiments, the client communication module 206 can also communicate using other protocols or mechanisms.

The client communication module 206 communicates with the auction controller 212, which provides the main programming logic for the operation of the system and executes stored computer instructions using one or more processors and memory. In one embodiment, the auction controller 212 is implemented as one or more application programs running on a server class computer, which may be the same or different computer as the client communication module 206. The auction controller 212 receives commands, queries and input from consumers and sellers via the client communication module 206. The auction controller 212 also provides the functionality for implementing, initiating, managing, and bidding within the social network framework. For example, the auction controller 212 collects information from the users initiating the auctions and finds sellers that are able to provide the products or services requested by the users in the auction. The auction controller 216 determines when an auction should being or end, and conducts the iterative reverse auction by interacting with the seller-specific auction engines 216, and determines, in real-time, optimal pricing for the request as bids for the next round. Once a stopping criteria has been met, the auction controller determines a winner (or winners) of the auctions. In some embodiments, the auction controller identifies additional consumers that may be interested in joining an auction, as well performing other functions described in greater detail below.

The server 104 may also include a database server 220, which stores data related to the system. For instance, the database server 220 stores auction information, statistics and information about the consumers (such as names, addresses, purchase histories, etc.), product and pricing information, seller information (names, products offered, regions served, etc.) regional information (e.g., country-specific data), server availability, and web traffic information. The database server 220 provides data to the application server 212. Software offered by ORACLE Corp., IBM, MICROSOFT, and SYBASE are all examples of database software systems that may be used to implement the database server 220. In some embodiments, each auction controller 216 includes a local data server for storage and processing of seller-specific configuration information, pricing data, bidding strategies, sell-specific optimization parameters, etc.

In some embodiments, the client 108 (FIG. 1) communicates with the server 104 via a web browser. In such an embodiment, the communication server 206 (FIG. 2) also includes a web server. The web server delivers web pages to the client 108 and provides an interface for communications between the web browser 116 and the auction server 104. Preferably, the web server is an enterprise class web server, such as APACHE from the APACHE FOUNDATION or INTERNET INFORMATION SERVER from MICROSOFT CORPORATION running on one or more server class computers, which may be the same or different computers than the communication server 206.

For embodiments in which the components and methods are provided as one or more software programs, the program may be written in any one of a number of high level languages such as FORTRAN, PASCAL, JAVA, C, C++, C#, BASIC, PERL, various scripting languages, and/or HTML. Data can be transmitted among the various application and storage modules using client/server techniques such as ODBC and direct data access, as well as via web services, XML and AJAX technologies. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a hard disk, an optical disk, a magnetic tape, a PROM, an EPROM, EEPROM, field-programmable gate array, or CD-ROM.

In accordance with various embodiments of the invention, a fully-automated live reverse auction based system and techniques for operating the system are implemented within or operate alongside of an SNP. Unlike conventional largely manual reverse auction platforms (such as those offered by Ariba), or group-buy sites such as BuyWithMe or GroupOn, the platform and methodology described herein takes advantage of users' (also referred to as "subscribers") micro-communities to offer opportunities to leverage consumer volume but in a non-intrusive fashion. Further, the automated auction engines allow sellers to compete for the subscribers' business while enabling dynamic pricing, thus simultaneously optimizing its own unique targets such as profit, revenue, traffic patterns and inventory. It provides an on-demand, trusted, transparent, real-time auction in which results are immediately available to all participants.

Most, if not all, SNPs collect and maintain information about each of their subscribers and actively uses such data to serve context and profile-specific display ads, suggest new connections (e.g., friends or business contacts) and offer other services. While much work as been done to determine an individual's "profile" for ad targeting, no such attempts have been made with respect to a subscribers "circle" of friends—or "micro-community." The systems and techniques described herein use key characteristics of a subscriber's micro-community on aggregated basis as input into a reverse auction process which allows sellers a unique ability to target a subset of the SNP's subscriber base. Such characteristics could include but are not limited to median age, income, education, location, buying patterns as a group, conversion rate, activity level over time, etc. In some cases the profiles (whether they be a consumer profile or community profile) may be represented as an index (either a single value or a vector of values), such that the profile may be mathematically manipulated and used in various calculations, as described below.

Figure 3:
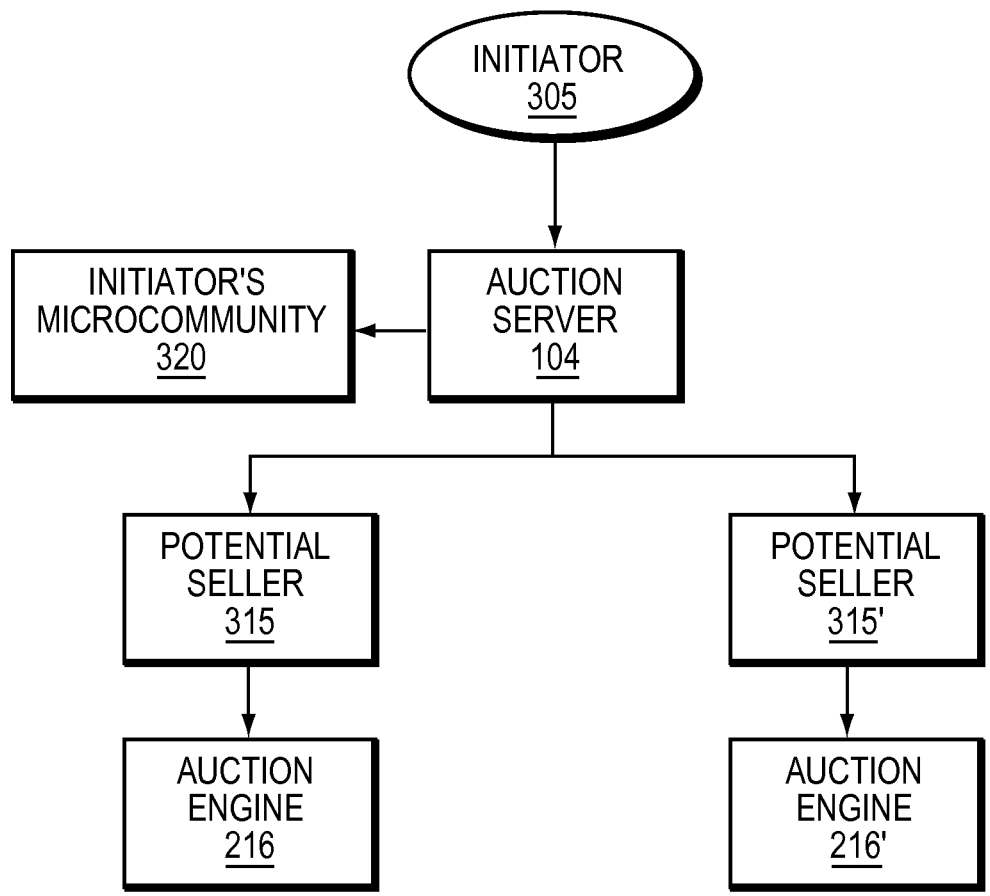
FIG. 3 illustrates certain interactions among participants in a reverse auction environment according to various embodiments of the invention.

Referring now to FIG. 3., a subscriber interested in purchasing a product or service (the initiator 305) initiates a transaction by providing information to the auction server 104. For example, the initiator 305 may be interested in purchasing a 52" Panasonic TV, and sends information such as the make and model number, desired features, and, in some cases parameters related to price (e.g., a maximum, a minimum, a desired price, etc.) to the auction server 104. The information submitted may also include a desired class of sellers (consumer ratings of at least 4 stars, a 95% satisfaction rate, etc.), and whether the initiator 305 is willing to share the details of the transaction with her micro-community 320. Both the initiator's consumer profile and her micro-community's community profile may be provided to potential sellers 315, who may then decide whether to participate in the auction process based on the deal parameters, the profiles and the seller's own target parameters. As depicted, only two sellers 315 are shown, however it is understood that any number of sellers 315 may receive auction information and participate in the auction process. The sellers 315 utilize one or more automated auction engines 216 to determine whether or not to participate in the auction, whether to continue in an auction once initiated, and how to bid during an auction. One exemplary embodiment of an automated auction engine is the "Seller Automated Engine" (SAEJ), as described in U.S. Pat. No. 7,778,882 and co-pending patent application Ser. No. 12/716, 727, the entire disclosures of which are hereby incorporated by reference.

Each auction engine 216 evaluates the information provided on behalf of its seller, according to its configuration, determines whether or not to participate in the auction, and if so, participates in the real-time iterative auction for the product/service requested by the initiator 305. The results of each iterative bidding round are provided back to the engine, thus facilitating an automated, ongoing auction among multiple participants without the need for manual intervention. In the example above, one possible result may include a price that the seller is 315 willing to sell the television for, given certain criteria such as the number of other possible sales that he may make given the size and profile of the initiator's micro-community. Subsequently, the initiator 305 decides whether to complete the transaction.

To track and monitor the status of auctions as they are initiated, updated, and completed, each subscriber is provided with a unique deal board. One embodiment of a deal board resembles a "dashboard-like" screen as rendered by the application server and populated with data regarding deals that the subscriber is either participating in or is monitoring.

When an auction is initiated, aggregated information about the initiating subscriber's micro-community is provided to each participating auction engine. The aggregated information, among other things, includes the community profile, number of members in the community, etc. This allows each auction engine to compute an optimal price for its respective seller participating in the auction while simultaneously optimizing other target parameters based on the collection of information. If the auction engine can commence a deal between the subscriber and a seller, and the subscriber accepts the offer and shares the deal with the subscriber's micro-community). The deal information is then propagated to the deal boards of each member of the micro-community as a secondary item. Thus, each subscriber's deal board receives notification of time-bound deals from transactions within his micro-community. The subscriber can then purchase the item directly from the seller under the same deal parameters as the initial subscriber was able to secure in her auction process.

Figure 4:
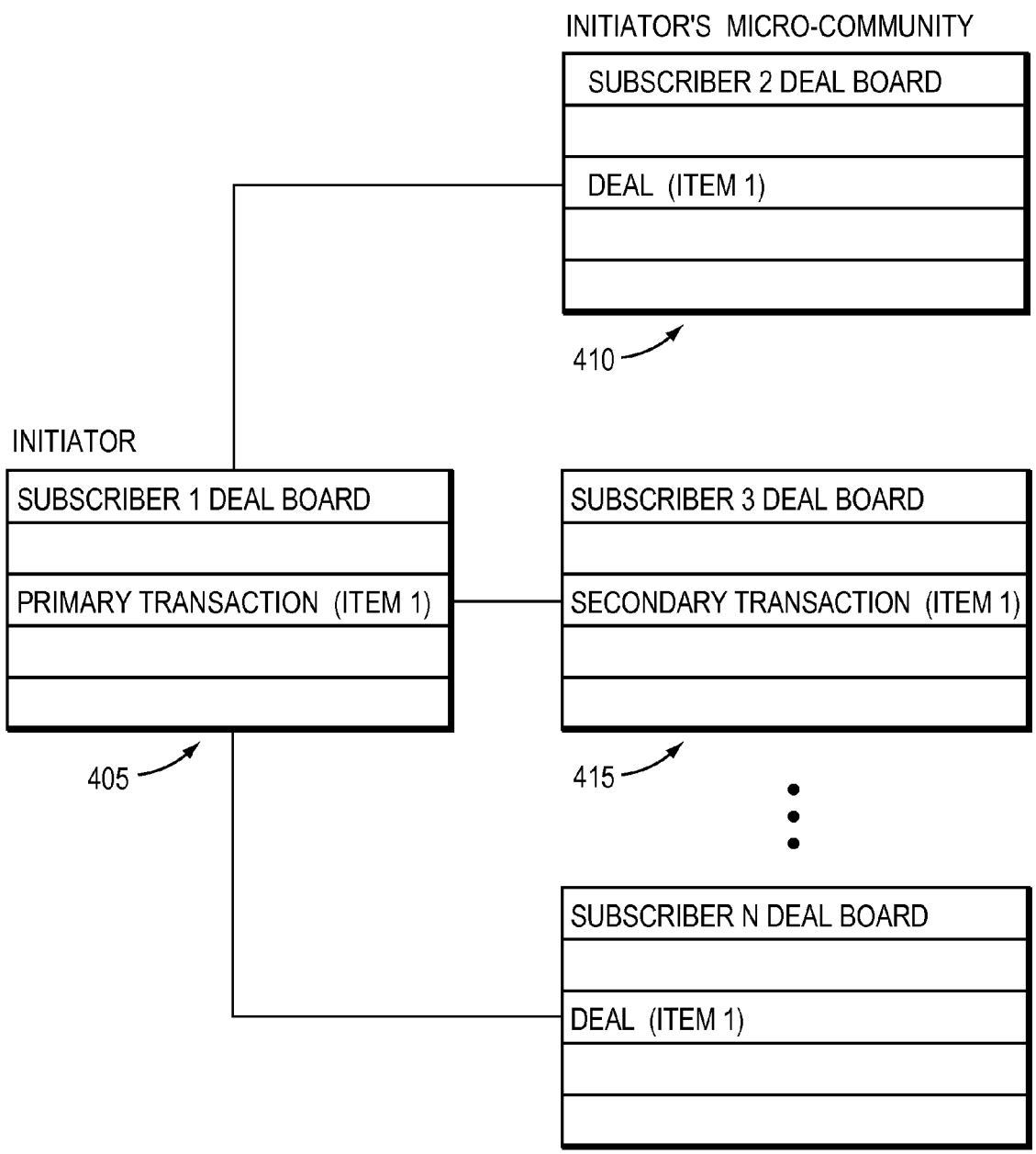
FIG. 4 illustrates the propagation of deal boards for subscribers to a social network participating in online auctions within a subscribers immediate community according to various embodiments of the invention.

As an example, and referring to FIG. 4, subscriber 1's deal board 405 includes the transaction she has initiated for item 1—referred to as a "primary transaction." To take advantage of the SNP infrastructure and inherent trust that exists among the subscriber's micro-community, other subscribers will also see the transaction on their deal board. For example, subscriber 2 may not yet have decided to participate in the auction, and as such the deal for item 1 appears in his deal board 410, but not as a transaction. Subscriber 3, however, has elected to participate in the transaction and based on seeing the offer from the seller (and, in some cases, encouragement from other subscribers) and as a result the "deal" is listed in his deal board 415 as a secondary transaction (i.e., a transaction not initiated by that subscriber). The deal boards are updated in real-time (assuming the initiator or those subscribers facilitating secondary transactions are willing to share) along with other transactions across one's micro-community. The sharing of information regarding the transactions can be either anonymous (e.g., someone in your micro-community has initiated a particular deal) or fully disclosed (John Smith initiated an auction—would you like to join?). In some cases, the willingness of the initiator to share may influence the bid price and the community profile as well as other variables as the auction engines compute seller's optimal bids during auction.

For example, if a subscriber has 100 friends in her micro-community, then her deal board lists deals as they occur in real-time within her micro-community, assuming the proper consents have been provided. The same is true for each of the 100 friends, each of whom has his own unique deal board, updated based on transaction activity within his own respective micro-community.

The deal board may include additional information beyond product-specific details, such as: (i) the duration for which the deal will be available to other members of a micro-community at the same terms without the need to run another auction (referred to herein as "deal validity duration;" (ii) the number of units available (at the current terms and/or in total); (iii) the actual volume of the deal providing a context to the price, i.e., the number of units which were requested by the subscriber to have received the current price (e.g., he purchased four units to get a 10% discount); (iv) the class of seller who sold the goods and various terms and conditions such as its return policy, etc.; (v) the seller's location; and (vi) reputation and customer feedback data for the seller.

In some embodiments, the deal board may include corresponding timers showing the time remaining to participate in and/or complete a secondary transaction, how many units remain available, and real-time updates as inventory is depleted or other auction parameters change. The deal board may also include a short review/experience/comment section. The deal board may also be integrated as an applet into micro-blogging sites such as Twitter so a subscriber or seller only needs to provide a single message as a command to the auction site. In some implementations, a subscriber can apply "filters" to her deal board to limit the products and deals presented to her, the members of her micro-community from whom she does not want to see deals, or use other characteristics (price, time, etc.) to limit her deal board. Alternatively, she may identify specific items which she will always be interested in, and may want to be highlighted, sorted to the top, and/or receive a message that an item meeting a particular criteria has been added to her deal board. For example, if a subscriber is routinely interested in deals pertaining to tickets to sporting events, she may set an alert that generates a text message so she is instantly aware of the deal. Such controls also assist the sellers to more accurately gauge the demand, as certain subscribers, although eligible to participate in the deal, may indicate that they are not interested.

Figure 5:
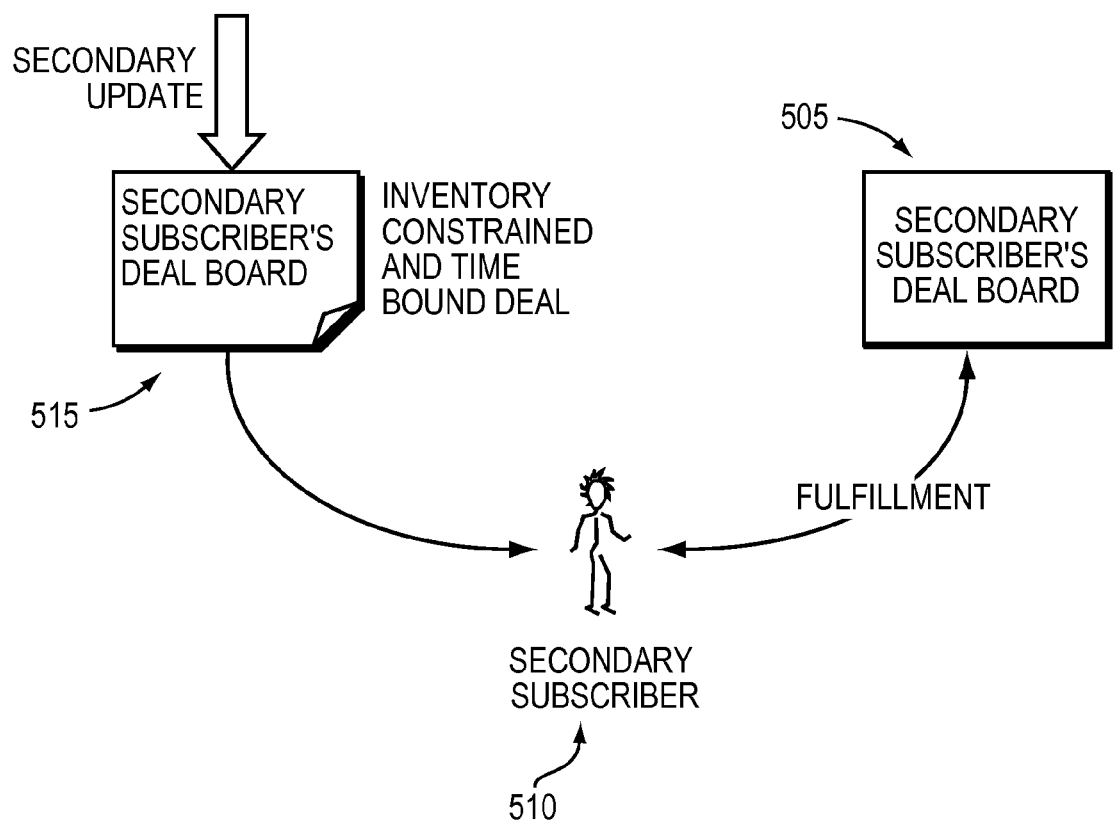
FIG. 5 is a flow chart depicting the extension of an online auction to additional members of an online community according to various embodiments of the invention.

Referring to FIG. 5, and continuing with the previously discussed scenario of 52" Panasonic TV, the winning seller 505 for example may make the deal available to the subscriber's micro-community (secondary subscriber 510) for eight hours and set aside twenty units on the same terms. Thus, the subscriber's micro-community also benefits from the deal resulting from the subscriber's reverse auction. The duration for which this deal is made available to the micro-community on their deal board 515 and the number of units offered are computed and optimized in real-time by the seller's auction engine. Among other things, these parameters may be a function of the micro-community profile, expected and/or historical conversions for the community, the offer price, and current revenue, profit, and inventory positions compared to their respective targets over a pre-defined duration. Members of the initiator's micro-community then have a window of time available to complete a transaction at the same price for up to the number of units offered. Transactions initiated by members of the micro-community are referred to as "secondary transactions" and each subscriber's unique deal board is updated in real-time based on his own deals and deals received by others within his micro-community.

Figure 6:
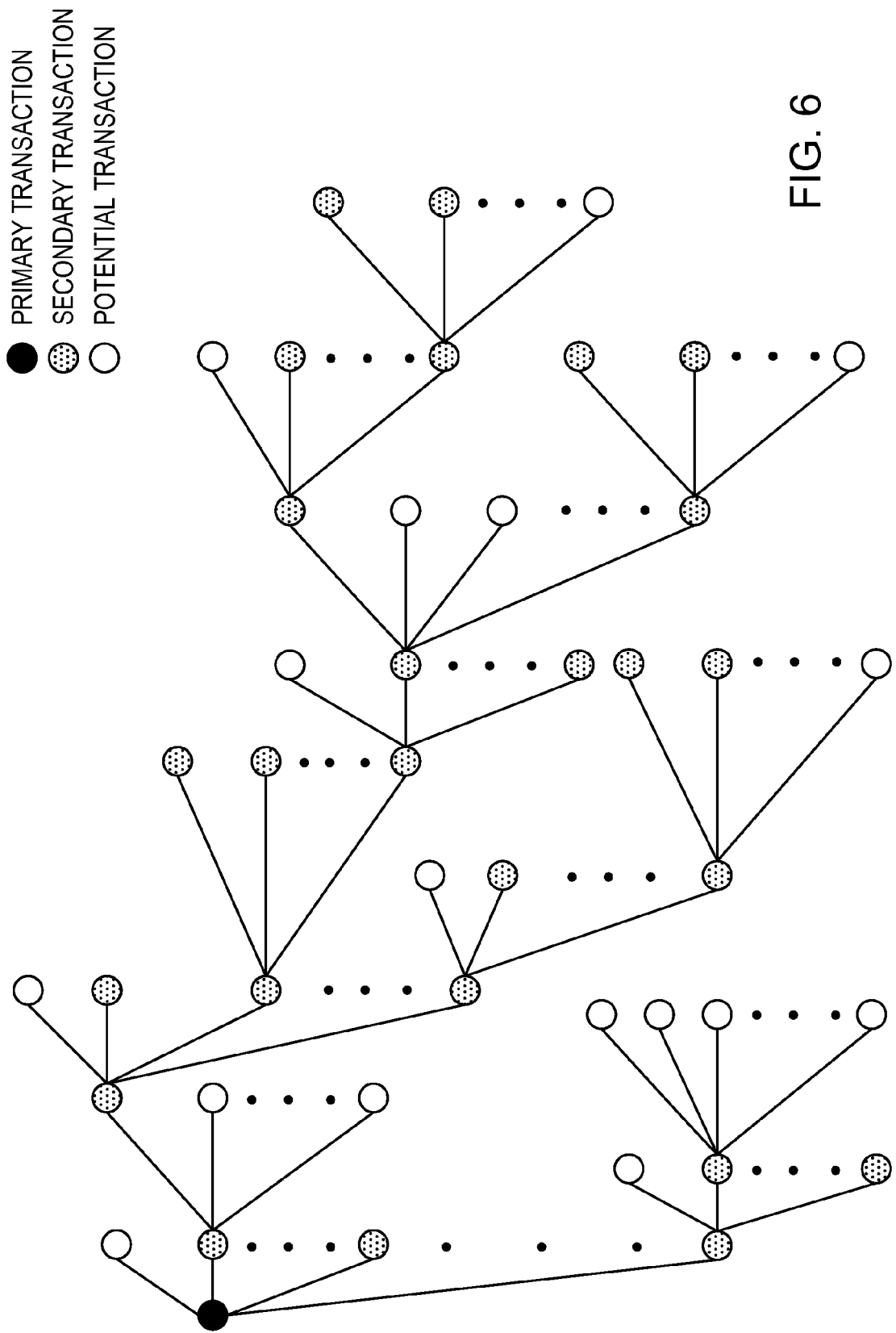
FIG. 6 illustrates the propagation of deals across a social network platform according to one embodiment of the invention.

When a secondary transaction is completed, there are multiple ways it can be managed and communicated through the SNP. For example, the winning seller may not want secondary transactions to appear in the deal board of other subscribers within the other subscriber's micro-community, as the seller may not want to offer the same deal, may not have sufficient inventory to cover the projected sales, or may have already met its profit or revenue targets. Alternatively, the seller may be willing to treat secondary transactions as a new primary transaction at the same price but altering other parameters. For example, the seller may alter the duration, number of available units, etc. optimized subject variables pertaining to the item, the seller and the members of the micro-community. In some circumstances, the seller may notice that a micro-community profile indicates that the majority of its members live outside the United States and the seller may not be equipped to ship products overseas. It should be noted that each secondary transaction may result in multiple such additional transactions and as a result a large number of transactions may occur in relatively very short duration due to the potentially exponential propagation via each micro-community node. Thus, a deal can propagate from an initial subscriber node to many nodes very rapidly, as illustrated in FIG. 6.

Figure 7:
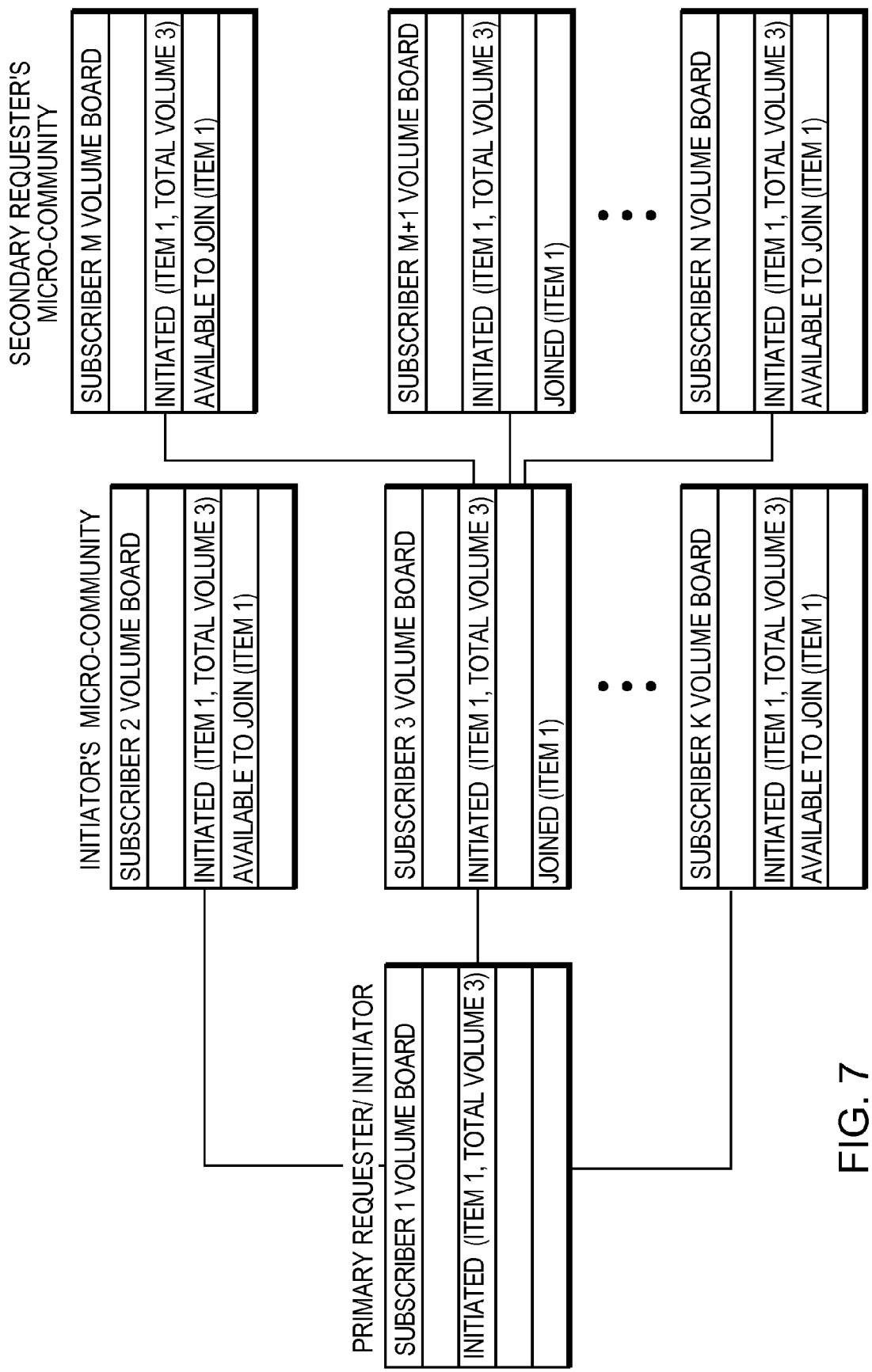
FIG. 7 illustrates the propagation of deal boards for subscribers to a social network participating in online auctions across multiple subscribers' communities according to various embodiments of the invention.

FIG. 7 illustrates the results of such propagation across deal boards of a primary initiator's micro-community when a subscriber initiates a "new deal." In this instance, Subscriber 1 initiates a first deal which Subscriber 3 participates in as a member of Subscriber 1's micro-community. Subscriber 3 then may initiate a transaction that propagates to his micro-community (Subscriber M, M+1 . . . N).

In addition either allowing a seller to specify the offer duration or calculating the auction offer validity duration empirically, the duration may also be computed analytically using a time dependent bid-response function $\rho(t,p,d,i)$. In addition to depending on time t, the function also depends on price p, offer duration d and a community index i.

The expected sales volume from the deal board may then be represented as:

$$\Delta N = N \int_0^d \rho(t,p,d,i) dt \qquad \text{Equation 1}$$

where N is the number of members in the initiating subscriber's micro-community.

The expected revenue is then calculated as:

$$\Delta R = \Delta N p \qquad \text{Equation 2}$$

and the expected profit is:

$$\Delta M = \Delta N(p-c) + f(N,p,d,T) \qquad \text{Equation 3}$$

where c is the unit product cost, and $f$ is inventory related cost reduction, which is a function of volume N, price p, duration d and remaining target time T. Possible inventory costs include item cost, carrying cost, ordering cost and stock-out cost.

The total expected contribution to the seller's utility may then be formulated as:

$$\Delta u = w_N u_N (N_T, N_t + \Delta N) + w_R u_R (R_T, R_t + \Delta R) + w_M u_M (M_T, M_t + \Delta M) \qquad \text{Equation 4}$$

where:
- $w_N$=sales volume utility weight;
- $u_N$=sales volume utility function;
- $N_T$=sales volume target;
- $N_t$=real time achieved sales volume across multiple deal/volume boards before the auction;
- $w_R$=revenue utility weight;
- $u_R$=revenue utility function;
- $R_T$=revenue target;
- $R_t$=real time achieved revenue across multiple deal/volume boards before the auction;
- $w_M$=profit utility weight;
- $u_M$=profit utility function;
- $M_T$=profit target; and
- $M_t$=real time achieved profit across multiple deal/volume boards before the auction.

The optimal bid price and offer duration is then determined as:

$$\underset{p,d}{\mathrm{argmax}}(\Delta u). \quad\quad\quad \text{Equation 5}$$

The expected sales volume ΔN can be used as number of units to offer for the auction. Additional constraints can be applied to the optimization, such as limited inventory, supplier's break and so on.

In cases in which it is difficult to estimate multidimensional bid-response functions based on historical data, and alternative approach removes the time dimension from the optimization and the optimization process is limited to price. In such cases, the offer duration is limited to a short period of time, and the number of units offered is set conservatively low based on current inventory level. At the end of the offer duration, or after the desired number of units have been sold, a decision is made whether to extend the offer duration or reset the number of units available. The decision may be based on certain real-time data such as inventory levels, number or dollar amount of pending transactions, conversion rates and/or newly added deal/volume boards for the same product. If not extended, the deal expires.

Using this approach, there is no need to estimate time based bid-response functions or to calculate an optimal offer duration or number of units to offer. As a result, inventory risks are reduced and profit is improved by making decisions in real time.

In certain implementations, the auction engines may cause secondary transactions to appear in the respective deal board of a subscriber however, instead of offering separate number of units for each micro-community, may offer a common pool across all deal boards. As an example, a seller may make 150 TVs available with same or different expiration timer associated with each transaction. Every time an additional TV is purchased by a subscriber (regardless of which micro-community to which they belong), the inventory available for all members is reduced and that subscriber's deal board is also updated with the remaining shared inventory. The status of inventory is simultaneously updated correspondingly at all the related deal boards in this example.

Such an approach allows sellers to very quickly sell a large number of units in a fairly short time at a significantly reduced, predictable and measurable acquisition cost when compared to conventional cost-per-click models using key attributes of the social networking platform. As a perspective on the magnitude, if one subscriber has 100 friends in her micro-community, and each of her friends has 200 friends in their own respective micro-communities, each of whom has 300 friends in their respective micro-communities, assuming each friend is unique in this model, there is a potential of reaching 6 million (100×200×300) subscribers in a very short order.

Each automated auction engine thus examines in real-time the deals it has won, their expected conversion rate, expiry time left, and potential impact on overall inventory, profit, revenue and other targets prior to participating in next auction or making a new bid.

For a given transaction, the number of deal boards displaying the transaction may grow as new deal boards are added. The deal validity duration and the number of units for each board may be determined by the winning seller's auction engine, based on the associated community profile of the new deal board and the performance of other deal boards individually. Other components used to determine deal board parameters may include an aggregated amount of deal validity duration left across all boards, cumulative conversion rates, variance from an expected conversion as a function of time, and the number of units sold. Using a retail implementation as an example, the real-time feedback from each of the existing deal boards coupled with the difference between the existing inventory, revenue, supplier's break, profit, and other parameters as compared to individual and aggregated deal board targets may used to determine the deal validity duration and the number of units to be offered for a new deal board. Thus, the number of feedback inputs to this seller-automated engine increases as progressively more deal boards are added and influence the outcome for the next deal board. This real-time feedback engine thus has two levels of optimizations for transactions related to this particular product. One for the deal board based on its unique parameters and another which is across all the deal boards associated with this specific transaction, product or service being offered.

Another independently initiated transaction by the same auction engine for the same product in an overlapping time frame may be assigned to a unique deal board, and the feedback loops associated with each deal board for the same product may be evaluated individually and/or jointly in real-time to compute the parameters values for the new deal board.

Each auction engine thus has associated therewith a common inventory and product-specific supplier's break-point for each product, thus providing a third level of real-time optimization that occurs in conjunction with, and simultaneous to, the two optimizations outlined earlier for a given product across independently-initiated transactions occurring in an overlapping time frame.

Figure 7A:
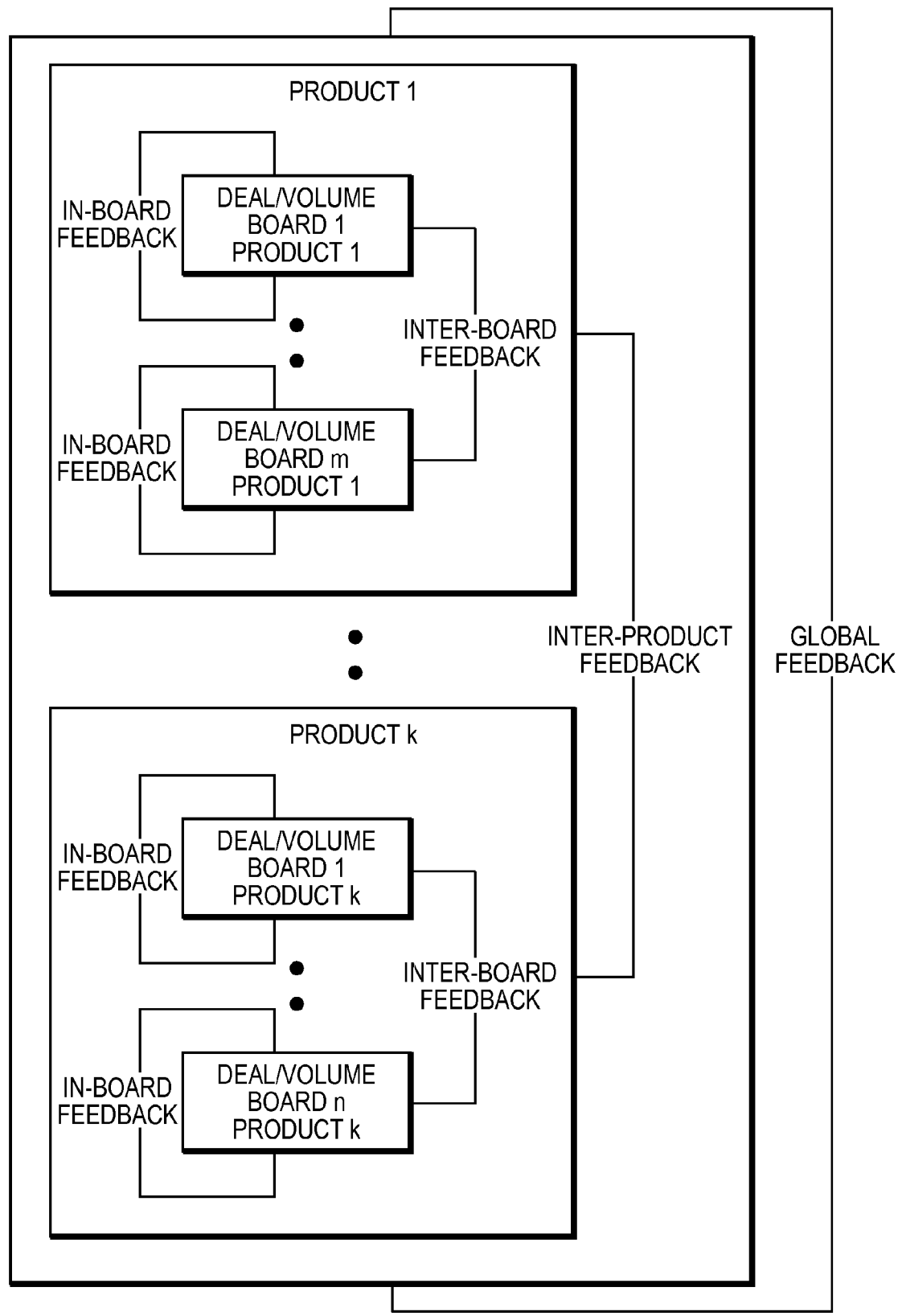
FIG. 7A illustrates the application of various optimization functions across multiple transactions for different products according to various embodiments of the invention.

Referring to FIG. 7A, these same three optimization functions may be used across deal boards offering different products. While the inventory numbers may be different for each product, the seller may have revenue and profit targets across the products, for example at the corporate level. These constraints may provide for a fourth level of real-time optimized computations using the feedback from each of the above sub-systems for same or different products in conjunction with and simultaneous to the previous three outlined above. All these feedback inputs may be used in the computation to determine the parameters for the next deal board. In each case, a seller's supplier's break may be product specific, calculated across product lines (vendor specific), or both. Thus the number of feedback paths into this closed loop adaptive engine can grow rapidly.

Each auction engine continuously monitors the status and performance of each of its deal boards and depending on the performance of a deal board, will extend the deal validity if, for example, additional inventory is added or the profits continue to meet or exceed expectations. In one of the alternatives, the incremental duration may have certain constraints such as it can only be increased once, or it can be only 50% of the original duration. In some instances, some deal boards may be extended any number of times and for any length of time.

If the subscriber is not willing to share the deal on the deal board with her friends, the auction is simply run as a single unit auction (or multiple units being purchased by a single subscriber). However, if the subscriber is willing to share the deal with her friends, the auction is modeled as a multi-unit auction, allowing the seller to sell more to this community with lower prices.

EXAMPLE

For any given subscriber's micro-community with N members, the expected sales volume from the community is:

$$\Delta N = N\rho \quad \text{Equation 6}$$

where ρ is a time-aggregated bid-response function within the auction duration, which is a combination of a seller's winning probability against other sellers and acceptance probability by the members of this micro-community. The bid-response function can be considered as the final conversion ratio, and is also a function of bid price p and community profile i.

The expected revenue from the micro-community is then $$\Delta R = N\rho p \quad \text{Equation 7}$$

and the expected profit is calculated as $$\Delta M = N\rho(p-c) \quad \text{Equation 8}$$

where c is the unit cost.

As described earlier, the computation of bids for an auction is influenced by the presence of a non-zero deal validity duration deal board/s for an item.

In some cases, there may be multiple active deal boards for the same product, each initiated from within different (in some cases overlapping and in some cases non-overlapping) micro-communities. For example, suppose there are K active deal boards for the same product. The number of members of each micro-community for each board is Ni (where i=1, 2, . . . , K), and the product price is $P_i$ (where i=1, 2, . . . , K). The conversion ratios for the remaining deal durations are $\rho_1$, $\rho_2$, $\rho_K$. To find the optimal price p for a newly added deal board with N members and bid-response function ρ for the same product, the expected sales volume for the product from each of the micro-communities is calculated using the following formula:

$$\Delta N = N\rho + \sum_{i=1}^{K} N_i \rho_i \quad \text{Equation 9}$$

The expected revenue for the product from the all of the micro-communities is then calculated as:

$$\Delta R = N\rho p + \sum_{i=1}^{K} N_i \rho_i P_i \quad \text{Equation 10}$$

With an expected profit of:

$$\Delta M = N\rho(p-c) + \sum_{i=1}^{K} N_i \rho_i (P_i - c) \quad \text{Equation 11}$$

where c is the unit product cost.

The total expected contribution to the seller's utility can then be formulated as:

$$\Delta u = w_N u_N (N_T, N_t + \Delta N) + w_R u_R (R_T, R_t + \Delta R) + w_M u_M (M_T, M_t + \Delta M) \quad \text{Equation 12}$$

where:
$w_N$=sales volume utility weight;
$u_N$=sales volume utility function;
$N_T$=sales volume target;
$N_t$=achieved sales volume before the auction;
$w_R$=revenue utility weight;
$u_R$=revenue utility function;
$R_T$=revenue target;
$R_t$=achieved revenue before the auction;
$w_M$=profit utility weight;
$u_M$=profit utility function;
$M_T$=profit target; and
$M_t$=achieved profit before the auction.

The optimal bid price is determined as:

$$\operatorname*{argmax}_{p} (\Delta u) \quad \text{Equation 13}$$

and additional constraints can be applied to the optimization, such as limited inventory, supplier's break, etc.

The deal board validity duration is determined empirically. Assuming that the seller desires to capture the potential additional deals at the same price, the validity duration may be calculated as:

$$\frac{\int_0^T \rho_t(t)dt}{\int_0^\infty \rho_t(t)dt} = \alpha \quad \text{Equation 14}$$

where:
$\rho_t$=estimated acceptance ratio as a function of time;
T=auction duration; and
α=pre-determined, aggregated acceptance proportion.

The validity duration may also constrained by other factors, including available inventory levels of the seller, a cut-off date (e.g., end of month, quarter, etc.); a supplier's break, as well as certain psychological impacts where the validity duration impacts buyer behavior, which in turn affects the acceptance ratio, which can be modeled and factored into the bid response if desired.

In addition to deal boards, which list currently-executing deals as they evolve and expand to additional subscribers and sellers update their bids, the system also provides a dashboard of "proposed" deals using a "volume board." Continuing with the example of the subscriber interested in buying a 52" Panasonic TV, instead of the subscriber initiating an auction right away and consummating it when a seller wins, she may instead initiate a request on her volume board, effectively creating a "pool" of highly-interested potential buyers. This pool becomes valuable to sellers as the members are likely motivated to commit to a transaction, especially at certain price points. The request includes various deal parameters, including but not necessarily limited to the product and related details, a number of units, a desired delivery date, and the date/time she intends to specify as the start of the final auction (e.g., in one week); acceptable class(es) of sellers, a minimum volume needed to start the auction, results of interim auctions to show a reference/commitment price for a single unit by the seller (for the desired volume of the product), and a commitment price at which everyone who agrees to join the pool is committed complete the transaction. As an example, at any point within a time duration of seven days from start prior to the final auction, if the price offered by a seller were to reach $400 then all subscribers in the pool are committed to stay in the pool and cannot withdraw. In some instances, the sellers may be made aware of one or more of these parameters (likely the product details and a price), but not others. In some instances, each subscriber may be able to alter some of the parameters (e.g., delivery date) which may or may not be shared with the sellers.

The act of requesting a product by the primary requestor is referred to as "initiating" a request for the product. Once initiated, each specific instance of the request for the product is referred to as an "initiated item" or simply an "item." A secondary requester is referred to as "joiner" and the act of requesting in this form is also referred to as "joining" the item.

If a member of a subscriber's micro-community either initiates or joins an item, that community member becomes "enabled" to join the item as well. In some instances, a subscriber may be enabled for the same item by more than one member of their micro-community based on nodal connectivity among the SNP subscribers. In this case, the subscriber may choose any one of the possible enablers and join the item, and the subscriber offering that item is referred to as the "selected enabler."

A given product (identified by SKU, model number, etc.) may be initiated multiple times by multiple subscribers, and, in some cases, a single subscriber may also be allowed to initiate the same product multiple times with different price parameters. When an item is initiated in the initiator's volume board, it appears in his micro-community members' volume boards, and when a micro-community member joins the item, the item appears on all of his micro-community members' volume boards. For example if each of the initiator's micro-community members have an average of 100 members in their respective micro-communities, then each join requires an average of 100 volume boards to be updated. If 10% of the initiator's micro-community members join the item, and 10% of their respective micro-community members join the item, and so on for four degrees of separation from the initiator, the total number subscribers who have joined the item (including the initiator) is 1+10+100+1,000+10,000=11,111. The number of subscribers either joined or allowed to join the item is 1+100+(10*100)+(100*100)+(1,000*100)+(10,000*100)= 1,111,101. As a result, any changes to a single item initiated by a subscriber will be reflected in upwards of 1 million volume boards in real-time. Combined with the millions of items being initiated by millions of subscribers who may have hundreds of micro-community members, the synchronization and accuracy of all the volume boards becomes increasingly critical.

A subscriber may "leave" (or "unjoin") an item from his volume board as long as his commitment price (or the common commitment price) has not been met. In such a scenario, the item may be removed from his micro-community members' volume boards, except in cases where the subscribers might join the item through other enablers. For those micro-community members who joined the item through a particular subscriber (the selected enabler), they may unjoin the item, or select another enabler (if available to them) to re-join the item. As a result, the act of unjoining can ripple through the SNP in an exponential fashion. In the worst case, if the initiator "leaves" then the entire chain is unraveled and all the subscribers are removed from the item. In the above example, where the average number of micro-community members is 100, and an item has been accepted by 10% of subscribers in each of four degrees of separation, the item will be removed from all 1,111,101 volume boards. Alternatively, the initiator may transfer his responsibility to someone in their micro-community to continue on as the primary initiator. Moreover, because many subscribers have overlapping micro-communities (i.e., common friends among multiple subscribers) a subscriber may have multiple enablers for the same item. Further, the system may prevent the appearance of an item in an enabler's volume board based on another subscriber's joining the item if that subscriber is connected to the enabler though other subscribers, effectively preventing loops.

One parameter determined by the initiator and placed on the volume board is a "dream price," defined as the price at which the initiator and all of those who join the buying pool are committed to buy regardless of the volume and without requiring a final auction. Using the example above for the time duration of seven days, if the price offered by a seller (based, for example, on an interim auction and/or particular seller targets) were to reach $375 at anytime within the seven days prior to the final auction, then the transaction can be immediately consummated. In some cases, there may be certain participation criteria set (either by the initiator or a system administrator, or both) that must be met for a subscriber to join the buying pool. For example, if an initiator is looking to pool a group of subscribers to negotiate a large block of auto loans, he may specify a criteria such as a minimum credit score of 720, the loan size be greater than $10,000, the loan be no more than a certain percentage of the value of the car, and so on.

After placement of the request on the volume board, the volume boards associated with the subscribers that are members of the initiator's micro-community are updated in real-time and each subscriber can decide if she is interested in pooling with the request. In certain implementations, a subscriber's volume board may reflect multiple initiating requests for different products pending at any point of time and from different members of their micro-community. Thus, each subscriber's volume board is unique, and provides an opportunity to the subscriber's micro-community to benefit from a volume transaction. This volume board may also include both unit and volume pricing from recent auctions to show the potential and/or expected benefits to the subscribers.

In this real-time volume board, the subscriber initiating the request is considered the "primary requester" and her friends in her micro-community who decide to join the pool or anyone thereafter (who also meets the specified participation criteria, if any) are considered "secondary requesters." Consider again the example of a primary requester looking to buy a 52" Panasonic TV who initiates a request to pool. Subsequently, when one of her friends decides to join the pool for the TV, the volume board of the primary requester, each subscriber in her micro-community, and subscribers in the micro-community of the secondary requester are updated with a volume of two—meaning there are now two subscribers that are willing to be part of this deal. Thus, the original request propagates from a single node to many nodes as secondary requesters join the pool. Each secondary node has at least two links to trusted friends in its own micro-community (unless it is the last node with no follow-on connectivity), one from the subscriber from which she received her updated volume board and one from the subscriber who followed. This node-to-node relationship has a major advantage over a common pool that anyone can join independent of relationships among the participants, because common pools are subject to manipulation by sellers and often complied by entities other than the subscribers themselves, and the terms of the offers are typically determined in advance by the sellers. In contrast, the node-to-node relationship structure is defined solely by the personal and professional connections of the subscribers, and the proliferation of the deals are based on subscriber-provided deal parameters.

As the volume of subscribers increases, interim auctions are automatically run, time-stamped, and propagated to the volume boards of each requester and the members of their micro-communities. Some of these interim auctions may be classified as "price progress" auctions. For example, the winning auction for a TV by the initiator may have originally been $500, but the same TV may be priced at $475 for a higher volume (e.g., five). This updated, improved pricing for increased volume may entice others to join and another auction may then commence. This process can quickly spread across many micro-communities resulting in exponential volume growth. This process capitalizes on the key attributes and building blocks of the SNP platform and in effect forms transient and virtual buying pools consisting of friends who trust each other for the purpose of initiating, viewing and/or completing transactions for virtually any product/service, and once the transaction is completed the pools automatically disjoin.

In some implementations, the number of subscribers whose commitment price has been reached may also be used as input into the automated auction engines working on behalf of the prospective sellers. As noted above, if the buyers "dream price" has been reached, the deal is automatically consummated, as no auctions are needed and the first automated auction engine securing the right to sell at this price is automatically declared the winner. In cases in which multiple auction engines offer the dream price, ties may be broken randomly or using a system-defined policy. However, if the dream price is not reached by the end date specified by the initiator (the date of the "final auction") or no dream price is specified, the final auction is executed. In some embodiments, the final auction may be run using a "bump-up factor" (BUF) process as described in currently co-pending patent application Ser. No. 11/367,907, the entire disclosure of which is incorporated herein by reference. The BUF process eliminates certain limitations and last minute manipulations of a time-constrained auction as exemplified by the so-called "sniping" of auctions on eBay, and instead optimizes the objectives of both the buyer and the seller at the same time.

Each item is uniquely identifiable in the system, i.e., when an item is initiated, it is assigned a unique global id, referred to as "item id" or "item identifier." An item database stores item information such as item id, product id, price, winning seller id and other information needed to maintain the state of the item across all active deal boards. As the number of items grow, the item database may be a collection of multiple physical databases holding subset of items, thus providing a scalable solution.

Figure 9:
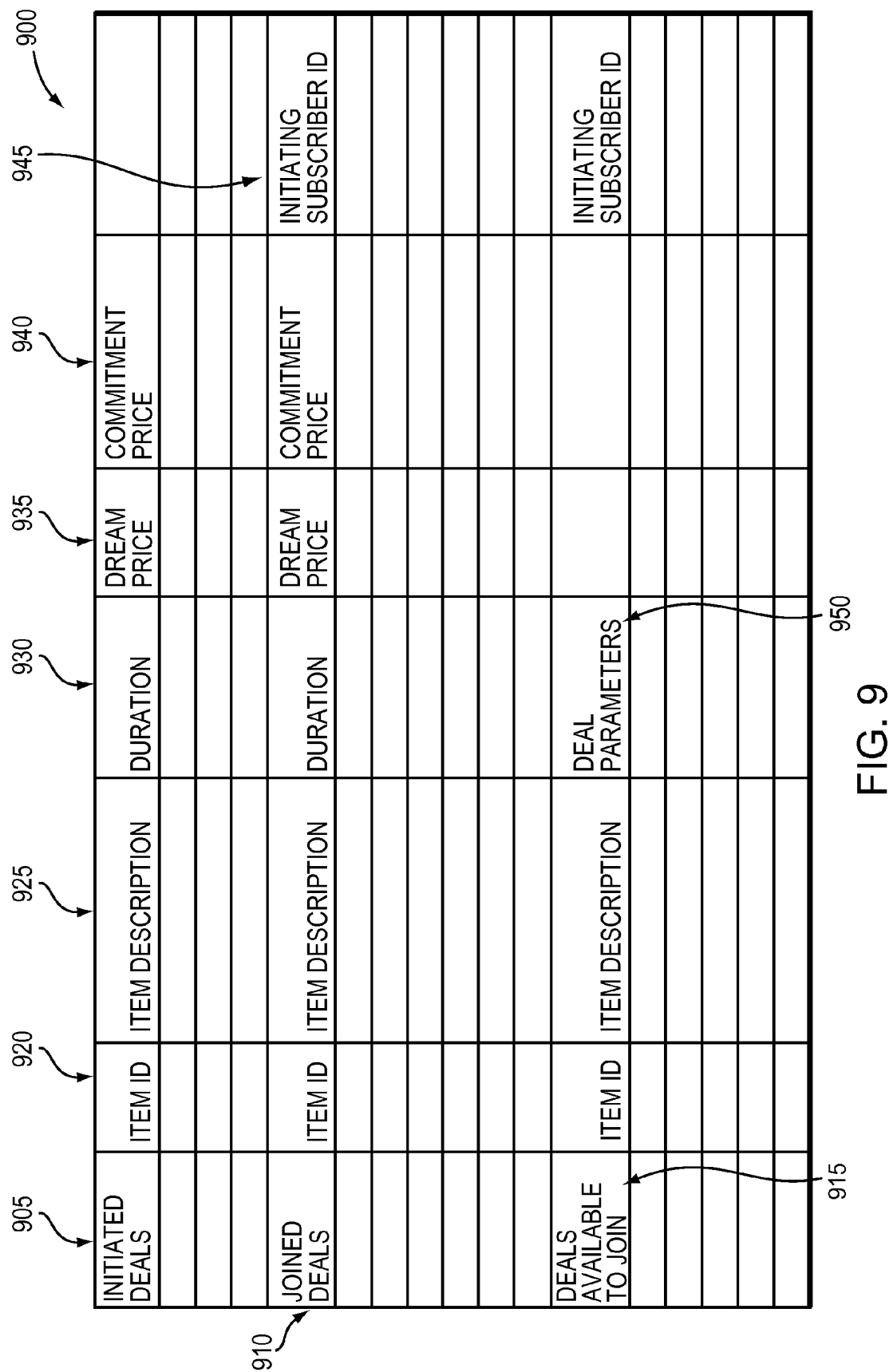
FIG. 9 illustrates one example of a volume board according to various embodiments of the invention.
Figure 10:
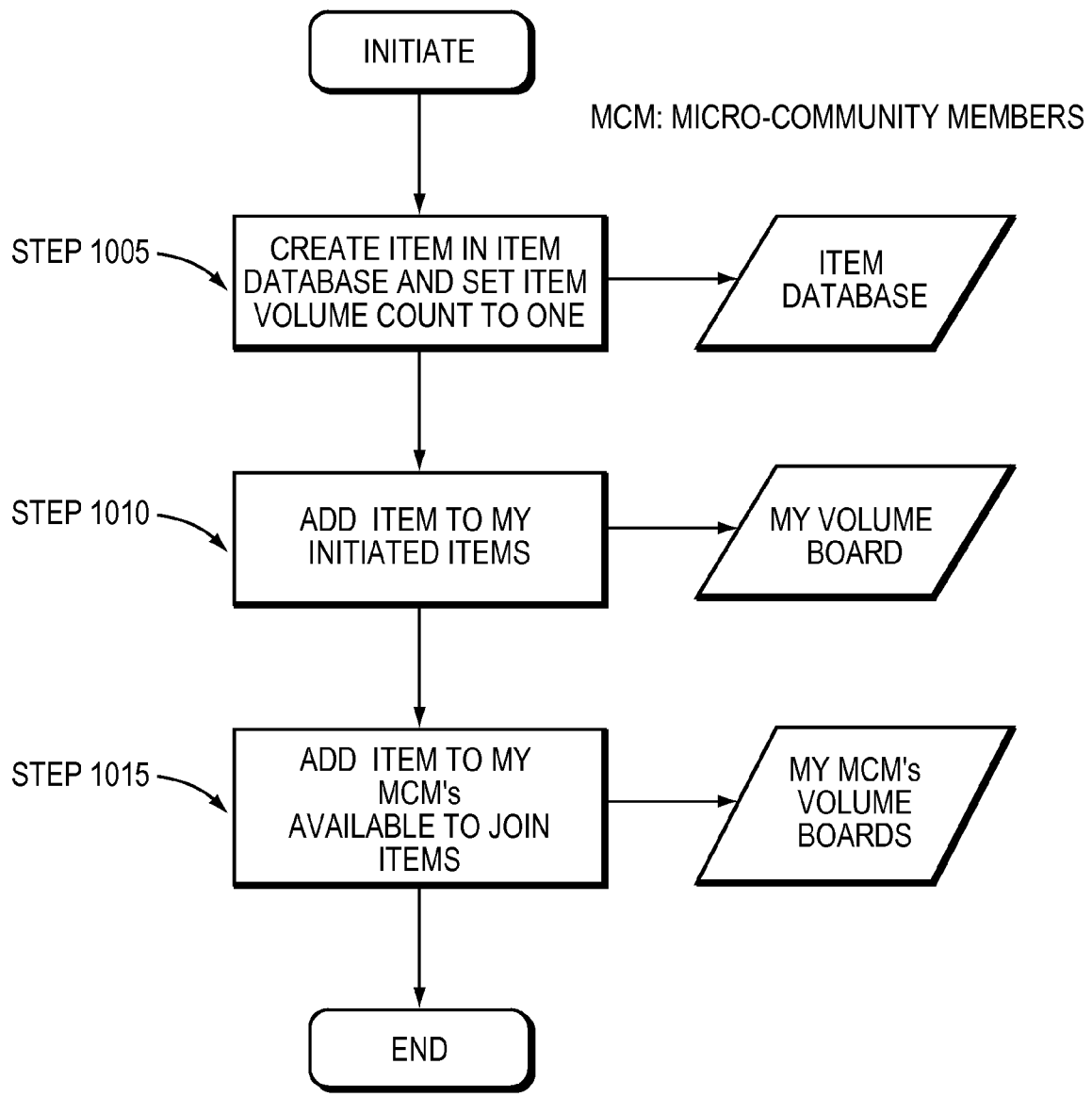
FIG. 10 is a flow chart showing the steps for initiating a new deal according to various embodiments of the invention.

FIGS. 8 and 9 illustrate examples of a deal board and volume board, respectively as they appear to subscribers using the SNP to initiate and participate in various auctions. For clarification, the deal board depicted in FIG. 8 provides information about completed transactions among a subscribers micro-community which may be available to them on the same or similar terms, the volume board of FIG. 9 provides information about pending transactions in which subscribers join a group that will eventually complete the transaction together. In some cases, transactions completed through a volume board may be propagated to deal boards of other subscribers to the SNP based on their relationships, characteristics, search results, etc.

More specifically, FIG. 8 illustrates a deal board 800 for an individual subscriber that includes primary deals 805 (deals initiated by that subscriber) and secondary deals 810 (deals she did not initiate but is enabled to participate in or may already be participating in). For each deal, the deal board 800 lists the item being sold, which may be indicated using an item id 815 and/or an item description 820. The deal board 800 may also list the deal validity duration 825, the number of units available 830 and, in some cases, may also provide a text field 835 in which a deal initiator may enter reviews and/or comments regarding the item being sold, the deal, the subscriber herself, as well as comments. For secondary deals 810, the deal board may also indicate the ID, name, nickname or other moniker for the subscriber that initiated the deal, so members of their micro-community will know which one of their friends or contacts initiated the deal.

FIG. 9 illustrates one possible embodiment of a volume board 900 that includes initiated deals 905, joined deals 910 and deals that are available to join 915. Similar to the deal board, the volume board 900 also includes an item id 920 and/or description 925 to identify the subject of the deal. A deal duration 930 may be included, as well as the dream price 935 and commitment price 940 for the deal. For joined deals and deals available to join, the initiating subscriber ID and/or name 945 may be included. In other instances, additional deal parameters 950 may also be included on the volume board 900.

Each subscriber has a unique volume board, that contains a list of items (in the form of item ids and/or descriptions), categorized in one of three categories—Initiated items, Joined items, and AvailableToJoin items. Items in the Joined category include the enablers' ids (subscribers offering the deal) as well as the selected enabler's id (the subscriber who initiated the joined deal). Items in AvailableToJoin category include a list of enablers' ids. In order to prevent loops in the system, a given item appears once in a subscriber's volume board. If, for example, an item to be added to a subscriber's AvailableToJoin list already exists, then any new enablers ids are appended to the item's enabler's list. To remove an item from the AvailableToJoin list, every enabler must either have left or unjoined that item. If at least one enabler still remains, the item stays in the AvailableToJoin list and those enabler's that leave or unjoin are removed, but the item remains listed with the other enabler ids.

FIGS. 10-16 illustrate the events and actions that create and maintain the items on the volume boards across the SNP. For an "initiate" event, (FIG. 10), a item is created in the item database and the item volume is set to 1 (step 1005). The item is added to the "initiated items" list for that subscriber (step 1010), and propagated to the "available to join" lists for each member of the subscriber's micro-community.

Figure 11:
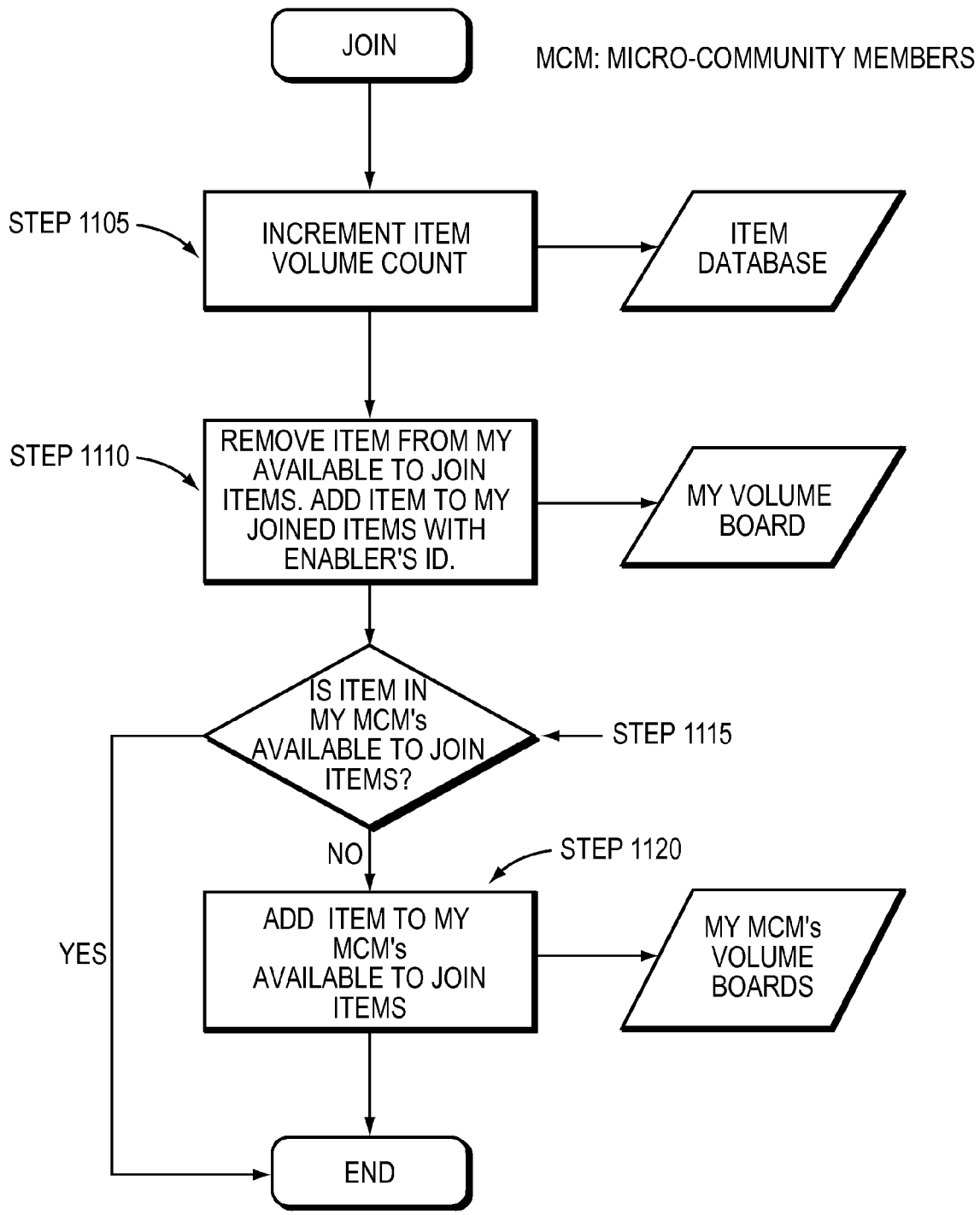
FIG. 11 is a flow chart showing the steps for joining a deal according to various embodiments of the invention.

FIG. 11 illustrates the join process, which represents a subscriber joining into a deal initiated by another subscriber and viewed on a volume board. When a subscriber joins the deal, the item volume is incremented up by one (step 1105). The subscribers volume board is then updated by removing the item from the AvailableToJoin list, and adding it to the Joined list, along with the enabling subscriber's id (step 1110). A check is then made to determine if the item is already in the AvailableToJoin list of the joining subscriber's micro-community (step 1115). If it is, no further action is taken. If not, the volume boards of the joining subscriber's micro-community are updated with the new item (step 1120).

Figure 12:
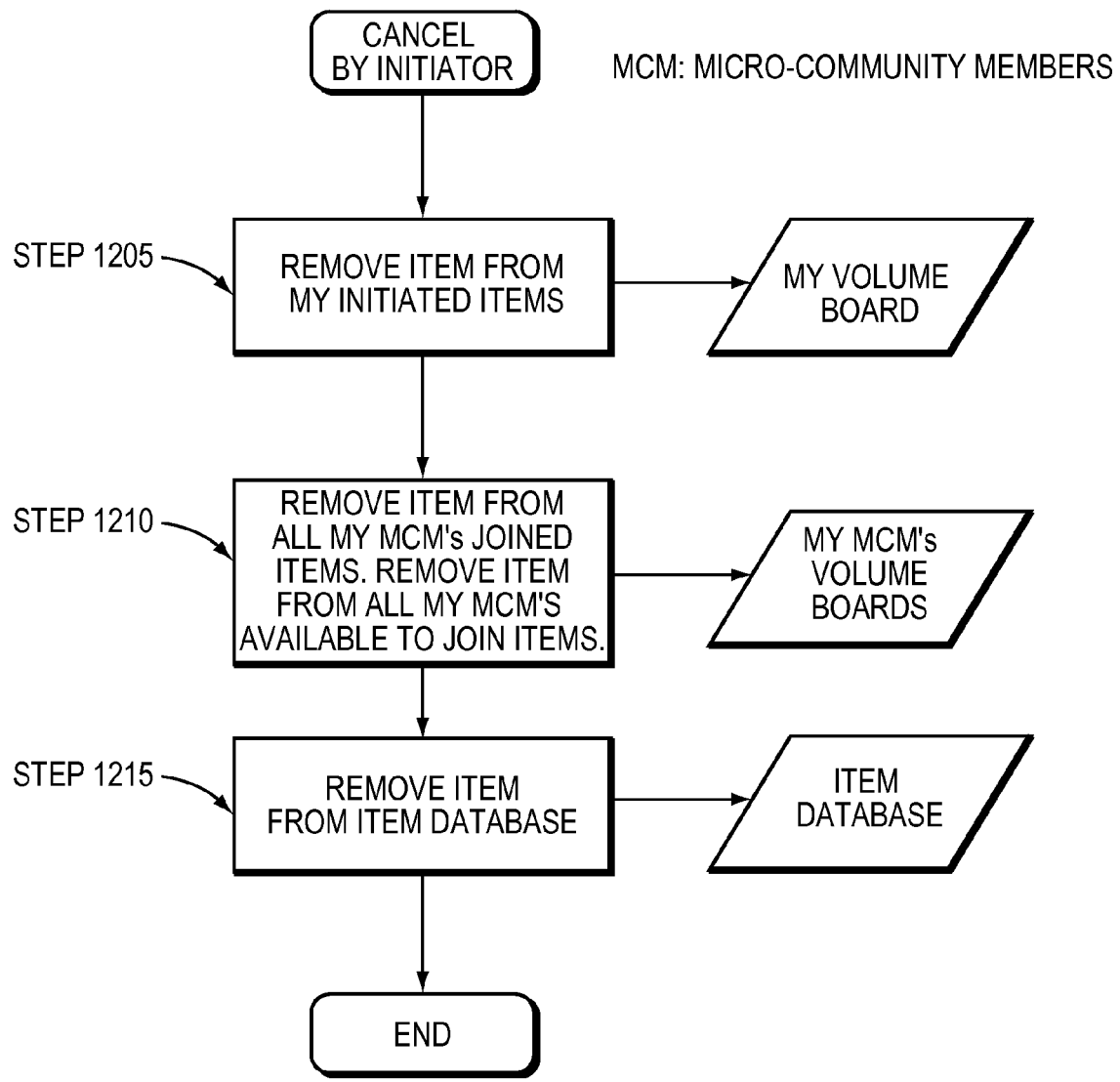
FIG. 12 is a flow chart showing the steps for cancelling a deal according to various embodiments of the invention.

FIG. 12 illustrates the process by which a subscriber who had initiated a deal effectively cancels the deal by removing it from the system. The subscriber first selects and then removes the item from her list of initiated items (step 1205). The item is then removed from the Join lists of the members of the initiating subscriber's micro-community who had joined the deal, and from the AvailableToJoin lists of all other members of the initiating subscriber's micro-community (step 1210). The item is then removed from the item database (step 1215). In some instances, the initiating subscriber cannot remove the deal once a commitment price has been met (e.g., at least one seller is willing to sell the item at the price requested by the initiator).

Figure 13:
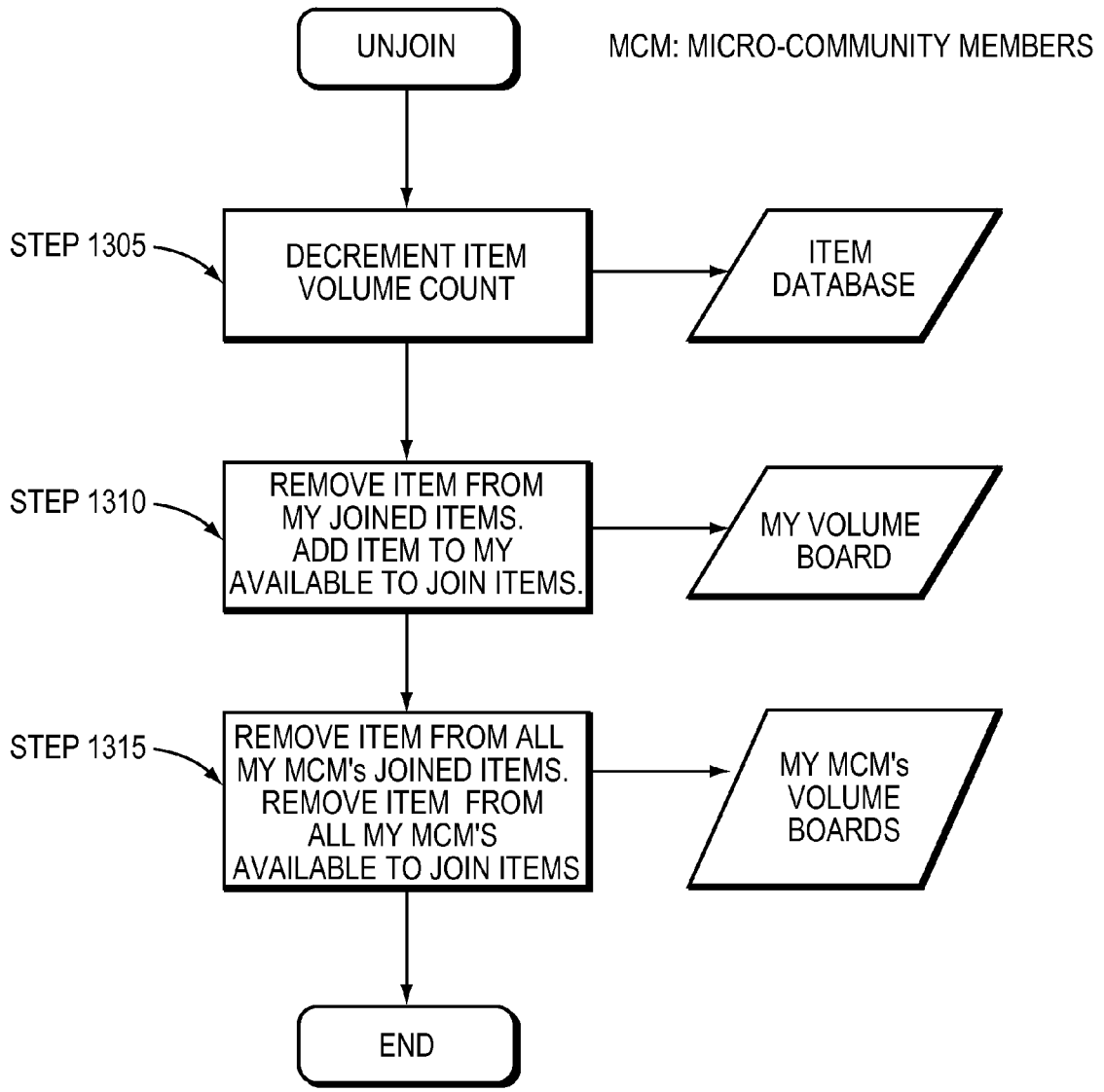
FIG. 13 is a flow chart showing the steps for unjoining a deal according to various embodiments of the invention.

FIG. 13 illustrates the process by which a subscriber "unjoins" or leaves a deal. The subscriber selects the deal from her Joined list, and the item count is decremented by one (step 1305). The item is removed from her Joined list and placed back into her AvailableToJoin list (step 1310). The item is then removed from both the Joined list (for those subscribers that joined the deal) and AvailableToJoin list (for those subscribers that had not yet joined the deal) across the subscriber's micro-community (step 1315). If the subscriber wishes to rejoin, the process illustrated by FIG. 11 above is repeated.

Figure 14:
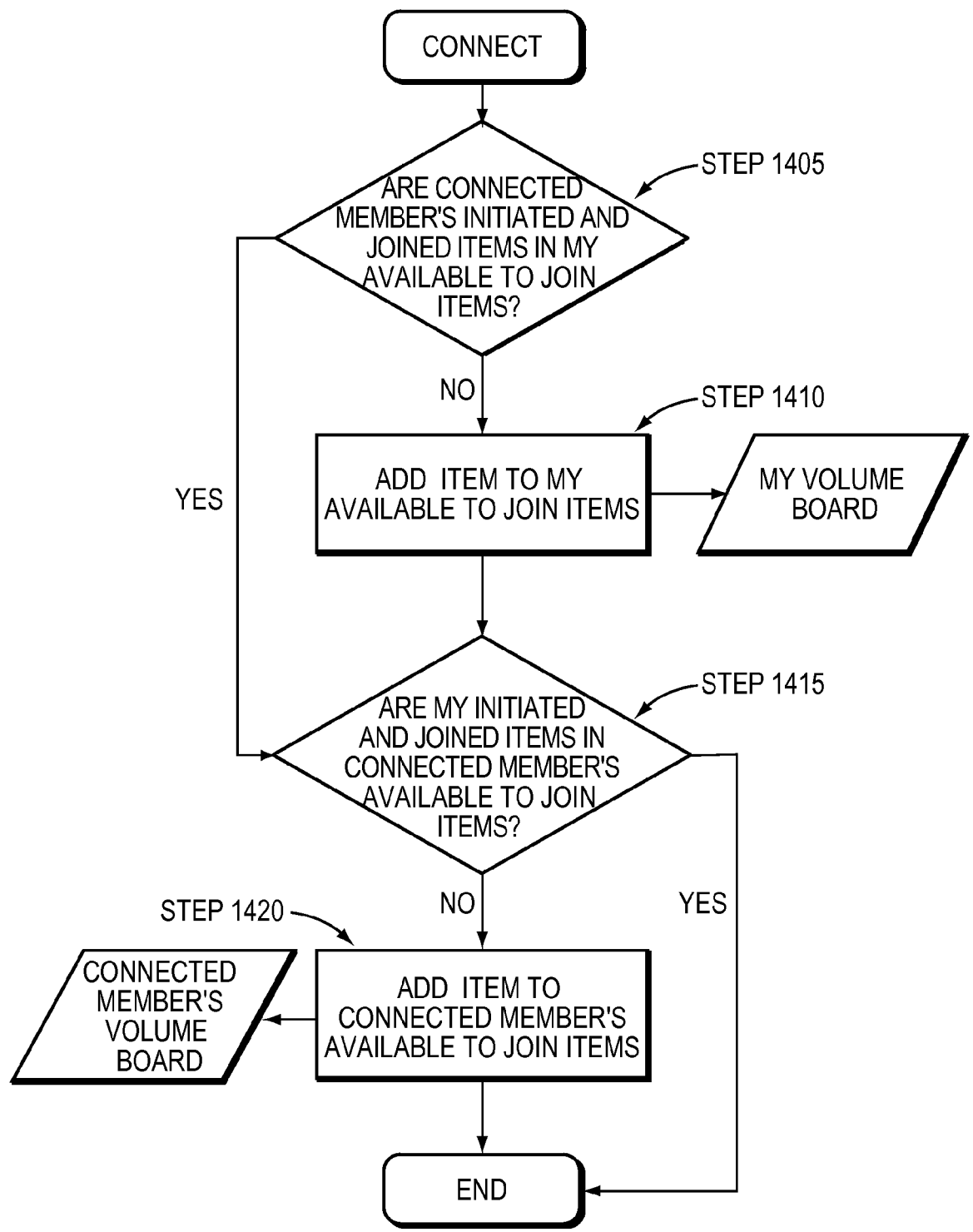
FIG. 14 is a flow chart showing the effects of subscriber connecting to another subscriber according to various embodiments of the invention.

FIG. 14 illustrates the steps performed when a subscriber connects to another subscriber (the newly connected subscriber), thus becoming a new member of her micro-community. A check is made to determine if the items already exist on the newly connected subscriber's Join list or AvailableToJoin list based on a connection through another subscriber (step 1405). If they do not, the Initiated items and Joined items from the initial subscriber are added to the newly connected subscriber's AvailableToJoin list (step 1410). Further, a check is made to determine if the items listed in the Initiated items list and Joined items list for the newly connected subscriber are listed in the AvialableToJoin lists of the subscribers she is now connected to (step 1415). If not, the items are added to the AvailableToJoin lists of those subscribers now connected to the newly connected subscriber (step 1420).

Figure 15:
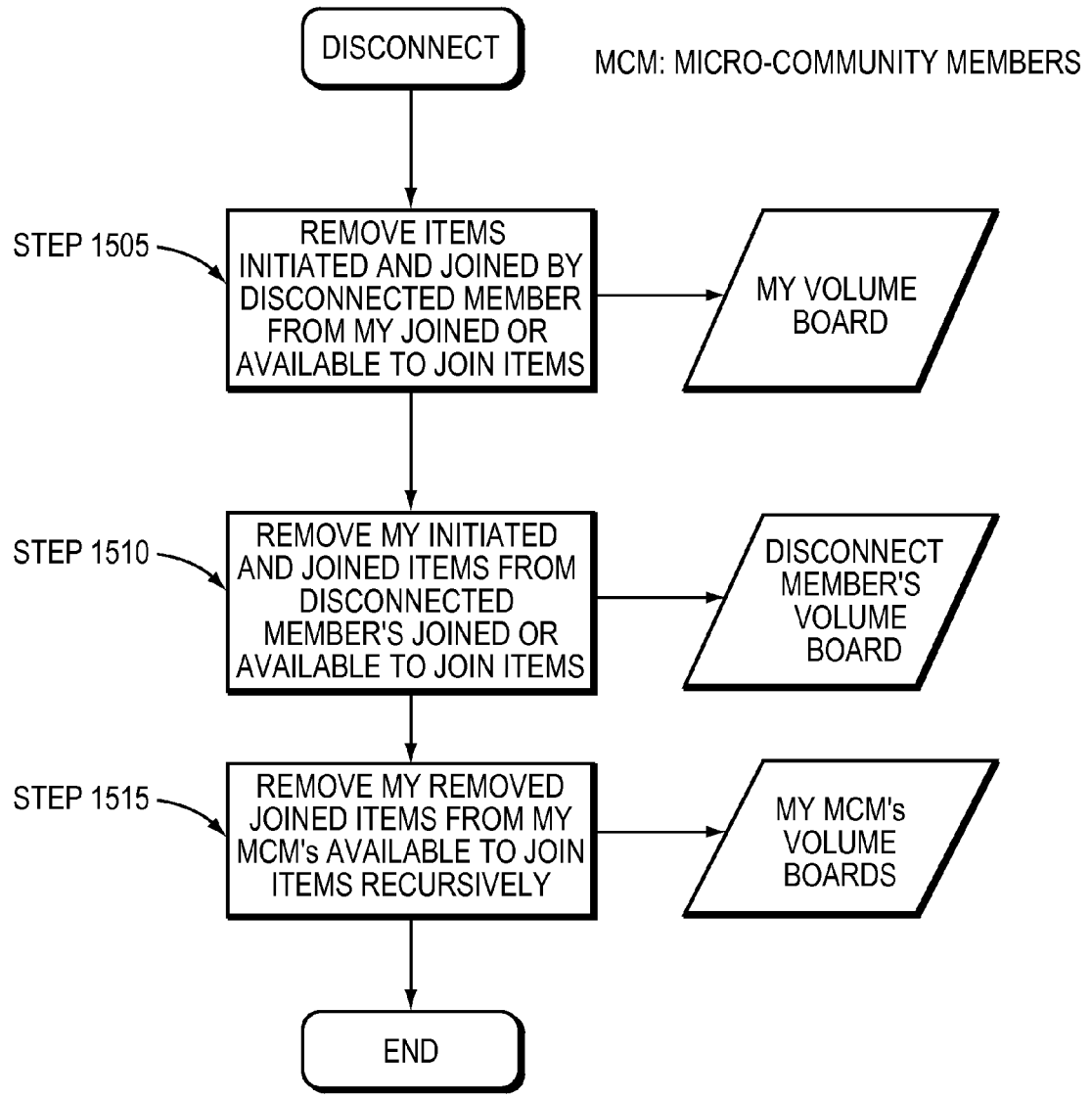
FIG. 15 is a flow chart showing the effects of subscriber disconnecting from another subscriber according to various embodiments of the invention.

FIG. 15 illustrates the steps performed when a subscriber (the disconnecting subscriber) "disconnects" from another subscriber. Items initiated by the disconnecting subscriber, whether joined or not, are removed from either the Joined list (if the subscriber joined the deal) or the AvailableToJoin list (if not) (step 1505). The same process is executed in reverse (step 1510), removing items initiated by or joined by the non-disconnecting subscriber form the Joined or AvailableToJoin list of the disconnecting subscriber. Further, any items that were removed from the Joined list of the non-disconnecting subscriber are also removed from the AvailableToJoin lists of members of her micro-community (step 1515). Similarly, when a subscriber removers herself from the SNP entirely (i.e., unsubscribes or unregisters), any items initiated by that subscriber are removed from the item database, and therefore are removed from any volume boards of the members of her micro-community.

Each time a subscriber's volume board is updated, a message (either an email or a message from within the SNP) is sent to the members of her micro-community, and their volume boards are automatically updated based on the steps described above. Those updates are also propagated to the next set of micro-community members, and so on. This fully-distributed approach allows each volume board to be independently updated and does not require (but, in some cases may use) a central store for the data used to populate and manage the volume boards. The independence of the volume boards, along with the update mechanism described above also prevents race conditions and deadlocks. For example, a particular subscriber's volume board may receive messages from multiple micro-community members. The messages can be processed sequentially and resulting changes applied to the specific volume board independent of the activities on the other volume boards. The independence of the volume board also lends itself to a highly distributed architecture, as described below.

In some implementations, subscribers may be able to extend their view of deals beyond their own micro-community. In such cases, a subscriber may select a "degree of separation" from herself for which she can see deals. For example, a subscriber may decide that she wants to see deals that are two degrees of separation from her—meaning she will be able to see and join deals initiated by members of her micro-community, as well as members of their micro-communities. Such a parameter may be preset in some cases or user configurable. Other possible system-level parameters may include:

- a limit on the number of micro-communities any particular volume deal can traverse;
- a limit on the absolute number of subscribers that can join any (or a particular) pool;
- whether or not sellers can (or must) fill all of or only a partial volume of the deal;
- whether sellers can "pool" their inventory, thus allowing multiple sellers to split the volume;
- whether secondary requestors may quit a deal until a pre-defined time frame prior to the final auction assuming the commitment price has not already reached or whether once joined a pool may not be quit; and
- whether the deal initiator can specify certain participation parameters, thus limiting who can join.

Each seller's auction engine performs two real-time functions related to the volume board. First, each auction engine determines whether to participate as an active bidder in numerous volume board-related auctions on behalf of a potential seller, and if so, enters the auction. Second, the auction engine scans the dream price (assuming it is provided to the sellers) of each deal and determines which deals to accept without initiating an auction.

The auction engines use numerous inputs when decided whether to participate in an auction and, if participating how to compute new bid values. For example, the auction engines may consider the potential volume of the deal, the current estimated revenue and/or profit to be received if the deal is consummated at the current price, inventory levels, a common commitment price (and how many subscribers have committed at that price), community profile information (either individually or aggregated) and supplier's break (discounts given to the seller by the supplier of sales reaches a certain threshold during a specific time period) as compared to the targets over a pre-defined duration such as a day, week, month or a quarter. Or, in some implementations in which each secondary requester can provide their own commitment price, the auction engine may consider the difference between the total volume and the number of subscribers whose commitment price has already been reached, essentially deriving the number of subscribers who are still looking for a better price. When scanning dream prices, the auction engine periodically computes gain in real-time across micro-communities for the products of interest and correspondingly optimize the targets. For example, the auction engines can decide to offer the product at the dream price if it expects sufficient marginal sales such that the supplier's break will come into effect.

For large SNPs, there may be hundreds or even thousands of initiators at any one time, and, as a result, hundreds of thousands of volume boards for a high-demand product. This multi-tiered, simultaneous optimization of various seller's objectives may be addressed using two levels of real-time processing for computations and optimization related to a particular product. The first level optimizes a particular product price in each initiator node and all of its secondary requesters, and the second level looks across all initiators and their respective secondary nodes for the same product.

When a subscriber successfully consummates a deal as the primary requester via volume board, that same request may be placed on the subscriber's deal board, along with a duration for which the same (or similar) deal will be made available to others in her micro-community and/or the inventory available for that product. In some cases, a seller may restrict the deal to the primary requestor's micro-community, whereas in other cases, the seller may allow the deal to expand to a secondary requestor's micro-community. The seller may offer the same duration for each buyer, or may offer different durations subject to the seller's inventory status, the community profiles for each of the buyers, predicted buyer conversion rates, the order the pool was created (e.g., FIFO, LIFO, etc.) other pending deals, as well as other factors.

Each auction engine computes auction bids in response to pooled requests for specific products. The bid calculation process considers the transaction volume, the number of subscribers who have met a commitment price, any specified dream prices, and other participation criteria such as expected conversion rates and community indices of some or all of the subscribers who have joined the pool. In addition, the auction engines may consider the performance of some or all non-zero deal validity duration deal boards for the same product at that moment in time. For example, if the results from these deal boards (either individually or in the aggregate) indicates a better than expected performance based on seller's desired targets (e.g., revenue profit, inventory, etc.) over time, the engine may be less aggressive with its bids. On the other hand, if the performance is less than expected, the auction engine may submit more aggressive bids across multiple requests, each within the seller's constraints. Thus, this feedback-driven adaptive closed-loop engine may produce different optimized bid outcomes for two independent auctions with corresponding pool requests which have similar characteristics in terms of volume and number of subscribers who have met the commitment price. In contrast to conventional rule-based engines, this approach uses real-time feedback and actual progress, status and/or results of ongoing auctions to influence later stages of individual actions. This can result in very different outcomes, even for auctions having similar or identical volume board characteristics.

In some implementations, a subscriber may search for a specific item being pooled on a volume board across the SNP. Such a feature is very useful when a subscriber is interested in a product that is expensive, rare and/or traded in relatively lower volumes because such items may be difficult to pool to a meaningful size in a relatively short duration. For example, a 103" Panasonic plasma TV typically may sell for $70,000 and at very low volumes (often only one). If the search results show an outstanding pool request for the item, the subscriber may join the volume board even through the request did not originate from within her micro-community. The SNP may, however, constrain subscribers from further propagating within this micro-community. Alternatively, the SNP may not constrain the subscriber, and treat the request as the joining of two separate pool requests. As such, instead of initiating another independent request to create a pool, the subscriber has chosen to join an existing volume board in conformance with its commitment price and dream price constraints, if any. In yet another alternative embodiment, two such separate independent pool requests may be joined at the request of one of the primary requesters, however, the nodal propagation of each pool request may remain independent (e.g., no cross-community expansion such that a subscriber can only join one volume board for a particular product) while combining the overall deal volume. The volume board may also display two distinct numbers, those who are part of a nodal propagation, and those who are not. The joining an unrelated existing pool may be automated by combining the volume of multiple pools for sellers to bid on the overall volume, while volume information for each initiator is preserved so that each trusted micro-community only sees its own volume. As an alternative, initiators may provide configuration options to make their volume board visible via search (or in a listing) across the social network, and allow initiators (for the same item) from outside its micro-community to join the volume board. When a new request for the same item is initiated, the SNP can automatically search to see if this item already exists in another volume board, and recommend that the new initiator join the existing volume board.

Similar functions may be performed by the same auction engine for other requests for the same product in an overlapping time frame. However, because the product in both transactions is same, it is likely that it shares a common inventory pool and possibly a product-specific supplier's break. In such instances, additional real-time optimization computations are performed prior to bid in an attempt to optimize the bid for the product across various volume boards, in addition to each initiated request. Thus, anytime a subscriber joins a volume board of interest to a seller, it may impact bid computations for each such new request across all the products of interest, as well as bid computations for dissimilar products.

One possible variance of the volume board that supports low-priced, high-volume products is referred to herein as a Mega Volume Board or "MVB". An MVB may be useful in situations such as buying a popular song, downloading a popular movie, or buying a video game. Whereas the subscriber may use the standard volume board and wait for volume to build-up via the nodal propagation, MVBs have short durations and high volumes to allow for items the subscribers want to purchase immediately. In such cases, the subscriber may search the SNP for and join an MVB for the desired item. For example, a song selling for 99 cents may be pooled for only a 15 minute duration, but may receive 10,000 requests. This allows subscribers to purchase products almost instantly, but still get the benefit of the group auction model.

In some cases, a subscriber may provide a list of items and allow the system to search for all of the items automatically instead of having to perform multiple manual searches. Once an MVB is found, the system may join the MVB (or initiate one if none is found) for each item. The list may include an type of item, however items available for instant download (e.g., songs, moves, books, software, etc.) are especially suited for the MVB model. This system substantially simplifies the subscribers' access to and usability of the system by eliminating many individual transactions and providing the benefits of pooling while offering a unique solution for a class of high-demand and typically low-priced products. This same approach may also be used for other applications, such as popular gift cards (e.g., Starbucks, Borders), in which the face values of the cards can be pooled, but the subscriber receives additional value (extra credits, a gift, points, etc.) beyond the face value of the card.

Another benefit of the MVB is that it reduces the credit card transaction fees and other payment charges (e.g., PayPal) which form a high percentage of a low-priced item. By pooling the requests, the SNP may become the intermediary and cover payment of these fees and, in some cases, share the savings with the subscribers.

Because the transaction volume for MVBs is significantly higher than standard volume boards, progress auctions may be held at much higher thresholds. For example, auctions may occur for every one thousand new subscribers that join the pool, on a periodic basis (e.g., every 5 minutes), or a combination of both volume and time. For example, if 10,000 requests are received in a minute, an auction can be held every minute, on the other hand if 2000 requests are received every minute, the progressive auctions may be held every five minutes and so on.

In another embodiment, a few friends can pre-form a group (e.g., work colleagues who eat lunch together every Friday) and invite restaurants to bid for their business by offering discounts. The auction can be held at a pre-determined time, or each restaurant can make an offer by a pre-determined time frame, or make offers any time prior to the Friday lunch. Everyone in the group does not need to join to take advantage of the offer, rather the pricing may be tiered based on the number of folks in the group who take advantage of the offering. In yet another embodiment in which the group wishes to attend a particular restaurant, the reverse auction process is eliminated, and instead the single seller's pricing or discount decision are based on real-time optimization of its targets as the number of people accepting the offer and related parameters evolve.

The volume board auction offer duration may also be computed analytically using a time dependent bid-response function $\rho(t,p,d,i)$. In addition to depending on time t, the function also depends on price p, offer duration d and a community index i.

The expected sales volume from the volume board may then be represented as:

$$\Delta N = N \int_0^d \rho(t, p, d, i) dt \qquad \text{Equation 15}$$

where N is volume board requested volume.

The expected sales volume is then calculated as:

$$\Delta R = \Delta N p \qquad \text{Equation 16}$$

and the expected profit is:

$$\Delta M = \Delta N(p-c) + f(N,p,d,T) \qquad \text{Equation 17}$$

where c is the unit product cost, and $f$ is inventory related cost reduction, which is a function of volume N, price p, duration d and remaining target time T. Possible inventory costs include item cost, carrying cost, ordering cost and stock-out cost.

The total expected contribution to the seller's utility may then be formulated as:

$$\Delta u = w_N u_N(N_T, N_t + \Delta N) + w_R u_R(R_T, R_t + \Delta R) + w_M u_M(M_T, M_t + \Delta M) \qquad \text{Equation 18}$$

where:
$w_N$=sales volume utility weight;
$u_N$=sales volume utility function;
$N_T$=sales volume target;
$N_t$=real time achieved sales volume across multiple deal/volume boards before the auction;
$w_R$=revenue utility weight;
$u_R$=revenue utility function;
$R_T$=revenue target;
$R_t$=real time achieved revenue across multiple deal/volume boards before the auction;
$w_M$=profit utility weight;
$u_M$=profit utility function;
$M_T$=profit target; and
$M_t$=real time achieved profit across multiple deal/volume boards before the auction.

The optimal bid price and offer duration is then determined as:

$$\underset{p,d}{\operatorname{argmax}}(\Delta u). \qquad \text{Equation 19}$$

The expected sales volume $\Delta N$ can be used as number of units to offer for the auction. Additional constraints can be applied to the optimization, such as limited inventory, supplier's break and so on.

EXAMPLE

Volume board auctions may be modeled as multi-unit auctions. If a seller wins a volume board auction at price p, all members with commitment prices higher than p have to commit. So the bid-response function is de-composed into two parts:

$$\rho(p,i) = \rho_p(p,i)\rho_w(p) \qquad \text{Equation 20}$$

where:
p=bid price;
i=Blended Consumer Index;
$\rho_P$=proportion of the members whose commitment price is higher than p, and it is the proportion of the members who have to commit if one of the sellers wins at price p; and
$\rho_w$=winning probability of the sellers against all competitors at price p.

Suppose an initiating volume board has a volume of N. The expected sales volume from the volume board is:

$$\Delta N = N\rho \qquad \text{Equation 21}$$

the expected revenue from the volume board is:

$$\Delta R = N\rho p \qquad \text{Equation 22}$$

and the expected profit is calculated as $$\Delta M = N\rho(p-c) \qquad \text{Equation 23}$$

where c is the unit cost.

There may be multiple ("K") active Volume Boards for the same product at any time. The number of units (volume) for each board is Ni (i=1, 2, ..., K), and the auction price is Pi (i=1, 2, ..., K). The price distributions for the active Volume Boards are $\rho 1, \rho 2, \ldots, \rho K$. In such cases, an optimal auction price p is calculated for an updated or newly added volume board with having N requests and price distribution $\rho$ for the same product.

The expected sales volume for the product from all active volume boards is:

$$\Delta N = N\rho + \sum_{i=1}^{K} N_i \rho_i \qquad \text{Equation 24}$$

the expected revenue for the product from all active volume boards is $$\Delta R = N\rho p + \sum_{i=1}^{K} N_i \rho_i P_i \qquad \text{Equation 25}$$

and the expected profit is calculated as $$\Delta M = N\rho(p-c) + \sum_{i=1}^{K} N_i\rho_i(P_i - c) \qquad \text{Equation 26}$$

where c is the unit product cost.

The total expected contribution to the seller's utility is formulated as $$\Delta u = w_N u_N(N_T, N_t + \Delta N) + w_R u_R(R_T, R_t + \Delta R) + w_M u_M(M_T, M_t + \Delta M) \qquad \text{Equation 27}$$

where:
- $w_N$=sales volume utility weight;
- $u_N$=sales volume utility function;
- $N_T$=sales volume target;
- $N_t$=achieved sales volume before the auction;
- $w_R$=revenue utility weight;
- $u_R$=revenue utility function;
- $R_T$=revenue target;
- $R_t$=achieved revenue before the auction;
- $w_M$=profit utility weight;
- $u_M$=profit utility function;
- $M_T$=profit target; and
- $M_t$=achieved profit before the auction.

The optimal bid price may then be determined as $$\underset{p}{\text{argmax}}(\Delta u). \qquad \text{Equation 28}$$

Additional constraints can be applied to the optimization, such as limited inventory, supplier's break and so on. The multi-level simultaneous optimization technique may be also applied to volume board, as illustrated in FIG. 7A.

Sellers can also use a subscriber's personal profile as a consumer-specific index to identify and serve targeted, personalized advertisements to the subscriber. In some cases, the seller may also consider subscriber's community profile (a "community" index) when determining whether to participate in a transaction. For example, it may be more beneficial for a seller to target a subscriber with more friends than another subscriber that has an otherwise similar profile, because access to more subscribers provides additional opportunities to share deals and convert sales through the deal and volume boards. Benefits also include reduced customer acquisition cost, increased sales revenue and profit.

For example, in traditional, non-SNP-based online channels in which sellers pay a "cost per click" C and see a conversion ratio $\rho$, the customer acquisition cost is calculated as $$C_{acq} = \frac{C}{\rho}. \qquad \text{Equation 29}$$

However, using the techniques and systems described herein, the customer acquisition cost becomes $$C_{acq} = \frac{C}{N\rho} \qquad \text{Equation 30}$$

Where N is number of members in a micro-community for a deal board, or number of requests in a volume board. As such, propagation using the deal and volume boards reduces customer acquisition cost by a factor of N, which can grow exponentially.

Finally the customer acquisition cost can be factored into profit calculation:

$$\Delta M = \Delta N(p-c) + f(N,p,d,T) - C_{acq} N\rho \qquad \text{Equation 31}$$

In addition to reduce customer acquisition cost, deal and volume boards provide other business opportunities for sellers. When a subscriber clicks a deal link, the seller can present other messages, such as more product information and up sell/cross sell offers.

The dynamic nature of the deal board presents several challenges in designing a system architecture that satisfies the deal board requirements as well as scales to the magnitude of a typical social network. For example, an SNP may have 100 million subscribers, each with a micro-community of 100 members. Assuming ten thousand unique products for sale, and each subscriber participating in one primary transaction and one secondary transaction, the platform would need to support 100 million deal boards, with each deal board containing 200 items (100 from each micro-community member's primary transactions and 100 from each micro-community member's secondary transactions). As a result, the system manages up to 20 billion item/transaction pairs (referred to as a "pair") across the SNP. Moreover, for popular items, and during busy shopping seasons, multiple subscribers are likely to purchase multiple items in short periods of time. Therefore, if 1 million subscribers are participating in transactions at any given time, the system updates 100 million deal boards, all in real-time. This translates into extremely large volumes of data, messages, and timers—much larger than can be handled by typical database systems and transaction processing systems. Each pair includes product information, available volume, expiration time, seller's information, as well as other information about the product and the transaction.

In another embodiment, a hardware-centric architecture as described below may be used. Given the massive number of simultaneous operations required, independent, and/or related, for millions of deal boards spread across the entire SNP, conventional hardware and software solutions may have insufficient processing and/or storage capabilities. As such, the system may, in some embodiments, use a configurable, cell-based multi-dimensional distributed architecture ("C2MD architecture") which leverages the virtual proximity of each subscriber to members of its micro-community. In the typical SNP environment, each subscriber connects only to the members (each being a "neighbor") in her own micro-community (a "neighborhood") and those subscribers subsequently connect to other subscribers within their own respective micro-communities, and so on.

Figure 16:
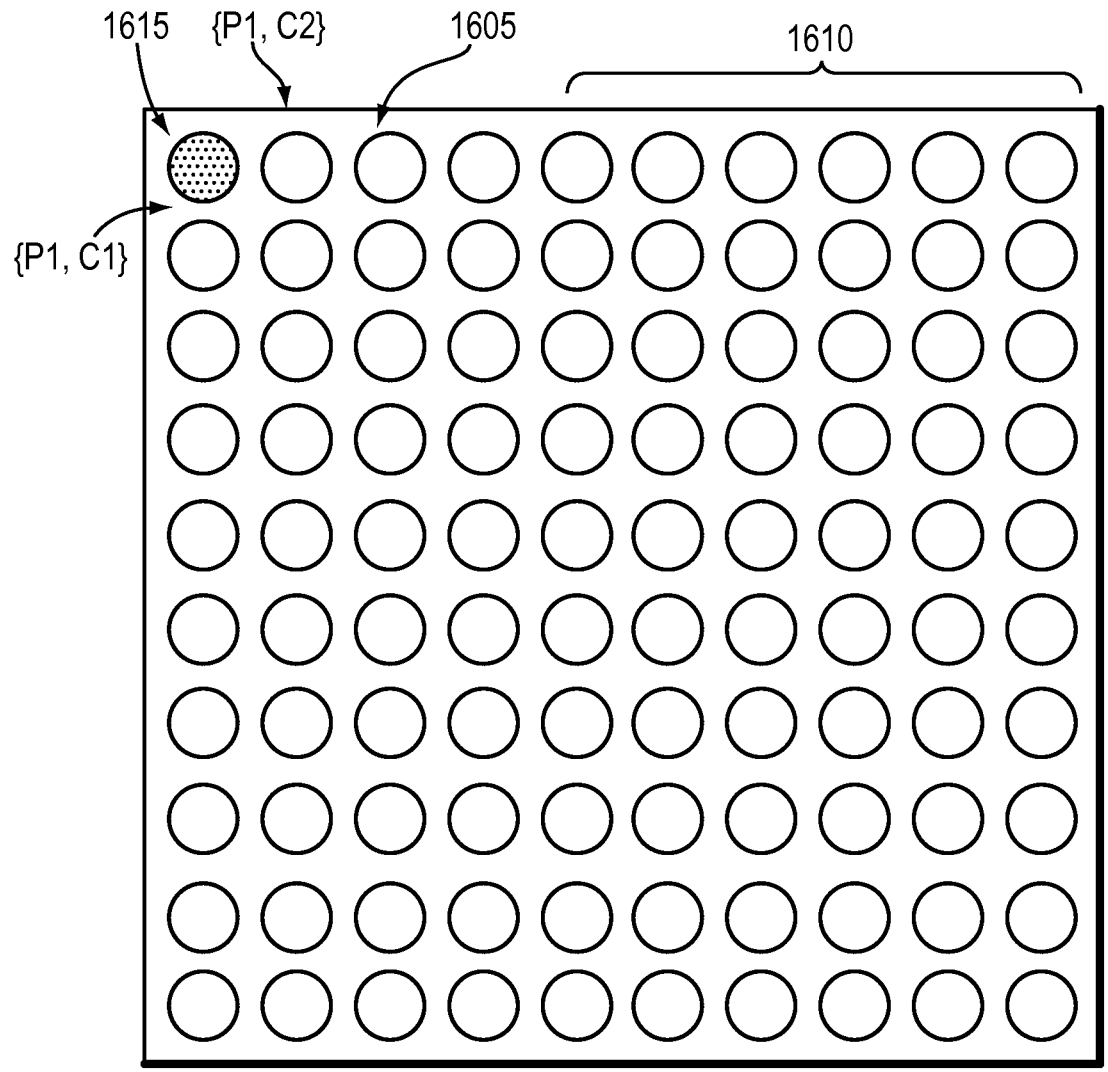
FIG. 16 illustrates a cell-based representation of the relationships among subscribers in a social network platform according to various embodiments of the invention.

Referring to FIG. 16, and using the C2MD architecture, each subscriber is mapped to a cell 1605, and each cell along with its own neighborhood together reside on a conceptual plane (also referred as "dimension"), 1610. The subscriber resides on a plane in two ways, either as a master cell 1615 surrounded by its own neighbors, or as a neighbor to each member of its micro-community in their respective dimensions. A cell in this architectural approach represents a number of storage elements such as several locations of a memory array, a register, or variations thereof.

Each cell is configured with rules on how to respond (for example, process the presented data in a specific manner and/or propagate information to its neighbors) to each specific event (e.g., a change in a cell's status) without requiring any centralized intervention. Other rules may reside in another memory along with special-purpose hardware. At each event, cell content to be operated upon and any corresponding rules are retrieved and the operations are performed using specialized functional units, integrated or otherwise, such as Adders, Multipliers, Bit Shifters, Exclusive-or, Counters and others as needed, and the resulting data is stored back at the cell. Multiple cells can be processed simultaneously, especially if the same event is impacting multiple neighboring cells and same rule is to be applied thus expediting the processing time rather dramatically. Rules are either reversible or irreversible. If reversible, the output is processed using the inverse function which decomposes it back into its original components by reversing the earlier operation, in effect, the output becomes the input, and input terminals become the output. This reversibility capability is highly efficient and has many applications, some of which are described below.

As an example, an SNP having 10 million subscribers will have 10 million unique planes, each one representing a subscriber and her own micro-community. Each cell in a plane is shared with an additional number of unique dimensions, and the number of dimensions is equivalent to the number of members in its own micro-community. For example, a micro-community having n members will result in n+1 dimensions (including the one in which the master cell resides) which intersect the subscriber's cell. In one instance, each cell may reside in multi-port memory in which each port intersects with a dimension, or alternatively a hierarchal arrangement of multi-port memories may be used in which a subset of multiple dimensions are mapped on each port. In another embodiment, each of the n intersecting dimensions can be mapped for the subscriber cell on the remaining dimension containing master cell, residing in a memory array.

As an example, a master cell in a plane is labeled as Cell 1 (also referred as C1). If the cell is located on plane 45 it is specified as (P45, C1). Therefore, this same subscriber may be labeled something other than C1 when residing as a neighborhood cell in a plane of it's micro-community members. For example, if the subscriber was listed in plane 48 it is specified as (P48, C7), assuming its mapped on C7.

In an implementation in which the subscriber initiating a transaction has 99 neighbors in its micro-community (thus total 100 cells including the initiating subscriber on this plane), each of the 99 neighbor cells in the initiating subscriber's plane has its own unique dimension. If each such neighbor also has 63 members in their own respective micro-communities (64 including itself), then each corresponding dimension will have 63 neighboring cells.

Figure 17:
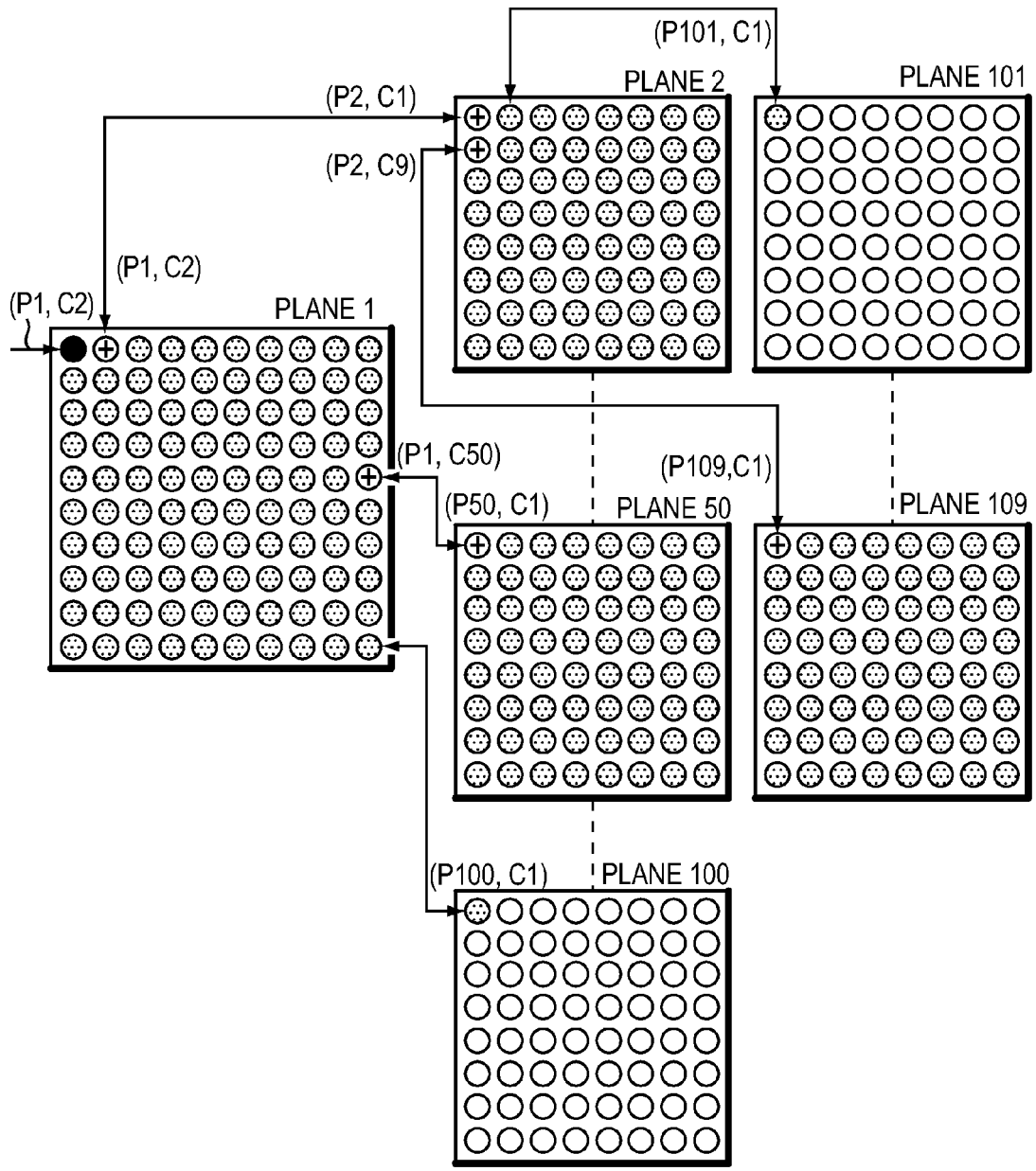
FIG. 17 further illustrates the relationships among subscribers using the cell-based representation of FIG. 16 according to various embodiments of the invention.

Referring to FIG. 17, when a subscriber having a cell located at (P1, C1) consummates a transaction, her cell is updated with the requisite information such as the deal price, deal validity duration, and number of units, etc. This event (called the "first event") triggers the execution of a corresponding rule for the event, in this case to propagate the information to all neighboring cells (numbered 2 to 100) residing on the same plane (plane 1). Execution of the rule changes the status of each of the neighborhood cells in plane 1, and the subscribers associated with those cells to initiate a secondary transaction. In some instances, further propagation of the information within its own neighborhood plane is prohibited unless the neighbor cell initiates a secondary transaction for this deal itself. If a secondary transaction is initiated at a neighboring cell (P1, C2) the corresponding rule for this event requires that deal information, including parameters (e.g., deal validity duration) be propagated to its 63 neighboring cells (one each for members of its own micro-community) residing on plane 2, and the initiator cell on plane 1 (P1, C1) is updated with a reduced inventory status.

In this example cell (P1, C2) represents the same subscriber as cell (P2, C1). However, in plane 1 it is part of micro-community of another subscriber (represented by (P1, C1)), whereas it is the "master cell" of plane 2 and all of its neighbors in that plane represent members of its micro-community. Continuing with the example, other events may also occur simultaneously with this second event. For example, a third transaction may be consummated by the cell C50 at plane 1 (P1, C50), which implicates similar rules but to a different "neighborhood" of cells, resulting in updating of all 63 cells on plane 50 and also the initiator cell (P1, C1), if, for example, the seller's inventory has changed. Similarly, if another cell on plane 2 (e.g., (P2, C9)) subsequently conducts a transaction (the fourth transaction so far) the previously described rule is reapplied, and all cells in its neighborhood residing on plane 109 (that subscriber's micro-community) are updated, along with cell (P2, C1) on plane 2, the cell where the transaction originated. As described above, changes in cell (P2, C1) (representing the same subscriber as cell (P1, C2) results in execution of a rule to update the initiator represented by cell (P1, C1) as a neighboring cell to (P1, C2).

Figure 18:
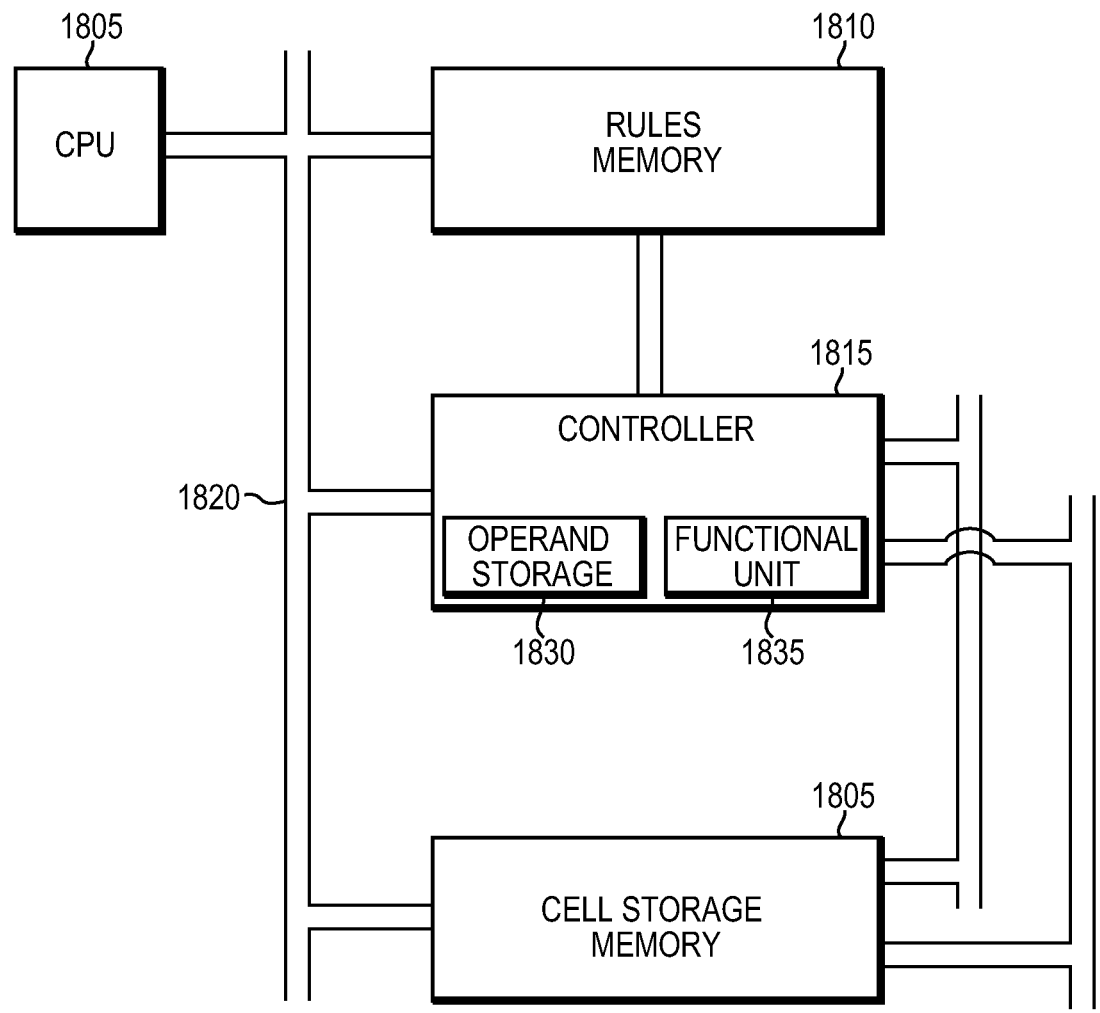
FIG. 18 is a schematic of one possible embodiment of a hardware architecture according to various embodiments of the invention.

Referring to FIG. 18, one embodiment of a hardware-based implementation of the C2MD includes a CPU 1805, cell storage memory 1810, rules memory 1815 and a controller 1820, all connected via a common bus 1825 for transferring data among the components.

The CPU 1805 configures the cell storage memory 1810, the controller 1820 and the rules memory 1815 via the common bus 1825 and communicates with each of these elements as needed. For example, the CPU may determine that certain rules require updating, or a particular event has occurred that necessitates an update to cell data Cell storage memory 1810 may be implemented as a multi-port memory register for storing each subscriber's cell information, along with pointers to each of the cell's neighbors. The rules memory 1815 contains rules governing the functions to be performed by the CPU 1805 based on potential inputs. The rules member 1815 also communicates with the controller 1820, which may be implemented as a multi-port unit, having sub-elements such as temporary storage 1830 to store data retrieved from neighboring cells and as well as functional units 1835 for carrying out computational tasks.

For example, when a subscriber initiates a transaction, the subscriber's cell data is updated in the corresponding cell storage memory 1810 and the controller 1820 is notified of the change in status. The controller 1820 then retrieves the pointers to this subscriber's neighboring cells, and subsequently retrieves the corresponding cell data from the cell storage memory via the multi-port interfaces and stored in its temporary operand storage 1830. In parallel, rules are retrieved from the rules memory 1810 and applied on each neighbor's cell in the storage 1830 by the corresponding functional units 1835. Each neighboring cell data in the cell storage memory is then updated with the results.

The above-described architecture may have many variants and alternatives. For example, in one such alternative, subscriber cells may not include pointers to neighbors, but instead use a single pointer to an address map table that stores actual neighbor pointers.

This neighborhood rule-based methodology can be executed simultaneously across a large number of dimensions without adversely impacting overall system performance and continues to executed from plane to plane until no additional transactions are initiated or all deal validity duration timers expire. This neighborhood-based, rule-driven C2MD architecture is especially suited for applications in which the impact of a change in a cell is confined to its virtual or physical neighbors because it facilitates rapid, simultaneous processing and information flow among a very large number of cells without centralized assistance. The architecture also provides flexibility, as the cell rules are user-configurable. For example, a rule may be designed to limit available inventory at each cell (e.g., on a subscriber-by-subscriber basis), as opposed to a singular rule limiting inventory for an entire pool of subscribers. Further, multiple, distinct rules may exist and operate at the same cell for similar yet independent deal flow events. For example, a subscriber may participate in 20 independent, simultaneous deals either as primary or secondary transactions, with different rulesets governing each deal.

Using the C2MD architecture, a transient virtual community consisting of many micro-communities can be rapidly created, and deals within those communities processed. Once completed, the virtual community is disbanded. Millions of such virtual broader communities can be formed on transient basis simultaneously executing a massive number of tasks, thus eliminating processing bottlenecks encountered by existing technologies/architectures.

In various embodiments the CPU and controller may be provided as either software, hardware, or some combination thereof. For example, the system may be implemented on one or more server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif.

The cell storage memory and rules memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly storage devices.

For embodiments in which the invention is provided as a software program, the program may be written in any one of a number of high level languages such as FORTRAN, PASCAL, JAVA, C, C++, C#, LISP, PERL, BASIC or any suitable programming language.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A computerized method for commerce within a social network platform, the method comprising the steps of:
   receiving, at a computer operating as an application server, an electronic message originating after a subscriber of a social network platform interacts with the social network platform through a client computing device, the message including initial auction parameters of a desired purchase;
   using the initial parameters calculating, by a computer operating as an auction controller, auction parameters and providing the auction parameters to one or more computers operating automated auction engines, each automated auction engine being associated with a respective seller;
   receiving, at the auction controller and transmitted from at least a subset of the one or more automated auction engines, one or more offers to fulfill the desired purchase for the subscriber, wherein each received offer comprises updated auction parameters programmatically-calculated by one of the automated auction engines that are increasingly favorable to the subscriber;
   identifying, by the auction controller, a most favorable set of auction parameters; and
   distributing, after commencing purchase by the initiating subscriber at the most favorable set of auction parameters, from the application server and over an electronic network the most favorable set of auction parameters to one or more additional client computing devices of additional subscribers of the social network platform, thus allowing the additional subscribers to complete a purchase according to the most favorable set of auction parameters.

2. The method of claim 1 further comprising receiving, at the application server, a message originating after the subscriber interacts with the social network platform through the client computing device, the message indicating a desire to complete the desired purchase at the most favorable set of auction parameters.

3. The method of claim 1 further comprising the automated auction engine providing the most favorable set of auction parameters limiting a duration during which the additional subscribers may complete the purchase according to the most favorable set of auction parameters.

4. The method of claim 1 further comprising the automated auction engine providing the most favorable set of auction parameters limiting an available inventory allocated to purchase by the additional subscribers.

5. The method of claim 1 further comprising the auction controller identifying the additional subscribers from members of the subscriber's community within the social network platform and one degree of separation removed from the subscriber.

6. The method of claim 1 further comprising the auction controller identifying the additional subscribers from members of the subscriber's community within the social network platform and more than one degree of separation removed from the subscriber.

7. The method of claim 6 further comprising configuring through the application server the degree of separation removed from the subscriber.

8. The method of claim 1 further comprising receiving, at the application server, messages originating after one or more of the additional subscribers interact with the social network platform through one or more of the additional client computing device, the messages indicating a desire to complete the desired purchase at the most favorable set of auction parameters.

9. The method of claim 1 further comprising including in the initial parameters of the desired purchase one or more of: description of an item to be purchased; a quantity of the item to be purchased; a desired class of seller; delivery options; and a return policy.

10. The method of claim 9 wherein the desired class of seller is included and comprises at least one of historical consumer satisfaction rating, consumer reviews, and industry ratings.

11. The method of claim 1 further comprising one of the automated auction engines calculating, and including in the updated auction parameters, a price at which a respective seller is willing to fulfill the desired purchase.

12. The method of claim 11 further comprising one or more of the automated auction engines calculating its respective updated auction parameters based on a respective seller-specific objective function.

13. The method of claim 12, further comprising one or more of the automated auction engines constraining the seller-specific objective function by one or more of: an actual inventory level; target inventory level; supplier break; actual revenue; revenue target; actual profit; promotional cost; advertising cost; customer acquisition cost; and profit target.

14. The method of claim 13 further comprising changing over time one or more of the constraints to the seller-specific objective function.

15. The method of claim 11 further comprising:
including a dream price in the initial auction parameters; and
upon receipt of updated auction parameters wherein the price matches or betters the dream price, identifying, by the auction controller, those updated auction parameters as the most favorable set of auction parameters and no further offers are considered by the auction controller.

16. The method of claim 1 further comprising the auction controller accessing a consumer profile of the subscriber from the social network platform and providing the consumer profile to the one or more automated auction engines such that the programmatically-calculated updated auction parameters are based, at least in part, on the consumer profile.

17. The method of claim 16 further comprising the auction controller identifying the additional subscribers from members of the subscriber's community within the social network platform and deriving the consumer profile, at least in part, based on the number of additional subscribers in the subscriber's community.

18. The method of claim 17 wherein the auction controller identifying the additional subscribers further comprises including members of a group formed before transmitting the initial auction parameters; and wherein receiving an electronic message further comprises receiving identification of the group.

19. The method of claim 16 further comprising the auction controller identifying the additional subscribers from members of the subscriber's community within the social network platform and basing the consumer profile to include a community profile derived from consumer profiles attributed to the additional subscribers in the subscriber's community.

20. The method of claim 19 further comprising the auction controller calculating an index based at least in part on one or more of: the additional subscribers' age; gender; income; education; location; historical purchase patterns; sales conversion rate; and activity level within the social network platform.

21. The method of claim 19 wherein the auction controller identifying the additional subscribers further comprises including members of a group formed before transmitting the initial auction parameters; and wherein receiving an electronic message further comprises receiving identification of the group.

22. The method of claim 19 further comprising using at least in part, by the automated auction engine providing the most favorable set of auction parameters, the community profile to determine a duration remaining and/or inventory to make available for transactions by the additional subscribers.

23. The method of claim 16 further comprising one or more of the automated auction engines calculating its respective updated auction parameters based on a respective seller-specific objective function which considers the consumer profile.

24. The method of claim 16 further comprising the auction controller further deriving the consumer profile based, at least in part, on the size of the subscriber's community within the social network platform.

25. The method of claim 16 further comprising the auction controller further basing the consumer profile to include a community profile derived from individual profiles of members in the subscriber's community.

26. The method of claim 1 further comprising displaying, on electronically rendered screens on the client computing device and the one or more additional client computing devices, one or more of: the initial auction parameters; the auction parameters; the updated auction parameters; and the most favorable set of auction parameters.

27. The method of claim 26 wherein displaying further comprises providing as hyperlinks one or more of: the initial auction parameters; the auction parameters; the updated auction parameters; and the most favorable set of auction parameters.

28. The method of claim 26 wherein displaying further comprises providing a filtering function in rendered screens of any subscriber, thereby facilitating the screening of transactions available to the subscriber and each of the additional subscribers.

29. The method of claim 26 further comprising propagating the electronically rendered screen to subsequent computing devices of subsequent subscribers being within a community of at least one of the additional subscribers.

30. The method of claim 29 further comprising stopping propagation of the electronically rendered screen when a stopping criteria is met.

31. The method of claim 30 wherein stopping propagation further comprises reaching an expiration of a deal duration associated with the transaction.

32. The method of claim 30 wherein stopping propagation further comprises reaching a depletion of inventory available to fulfill the transaction.

33. The method of claim 1, further comprising the application server facilitating search of the desired purchase or of the most favorable set of auction parameters by other subscribers to join the additional subscribers receiving the most favorable set of auction parameters.

34. The method of claim 1 further comprising the automated auction engine providing the most favorable set of auction parameters limiting one or more of a duration during which the additional subscribers may complete the purchase and an inventory still available for completing purchase by the additional subscribers, and distributing, from the application server to the client computing devices of the additional subscribers, the duration remaining and/or inventory still available for completing purchase by the additional subscribers.

35. The method of claim 34, further comprising the automated auction engine basing the duration remaining and/or inventory still available on a common pool subject to, at least in part, the additional subscribers completing purchase and/or other transactions and/or expected conversions of outstanding offers separate from the most favorable set of auction parameters.

36. The method of claim 34, further comprising the automated auction engine updating the duration remaining and/or inventory still available for completing purchase by the additional subscribers every time any transaction occurs.

37. The method of claim 1, further comprising the application server providing one or more of reviews and comments about the purchase available for completion to at least one of the additional computing devices of the additional subscribers.

38. The method of claim 1, further comprising the auction controller integrating with micro-blogging sites.

39. The method of claim 1, further comprising the application server enabling configuration of one or more filters by a filtering subscriber to identify or prevent if a potential purchase is presented to the filtering subscriber.

40. The method of claim 39, further comprising the application server generating a text message to the filtering subscriber.

41. The method of claim 1, further comprising at least one of the automated auction engines distributing information or up-sell or cross-sell offers through the application server to at least one of the additional subscribers who views the most favorable set of auction parameters.

42. The method of claim 1 further comprising at least one automated auction engine optimizing the updated auction parameter calculation factoring other transactions and/or offers completed and/or pending.

43. The method of claim 1, further comprising the application server serving targeted, personalized advertisements, from one or more of the automated auction engines associated with respective sellers, to at least one of the subscribers.

44. The method of claim 43, wherein the identification of the subscribers who are served targeted, personalized advertisements is based on expected benefit to the respective seller.

45. The method of claim 1, further comprising the auction controller continuing receiving offers until a stopping criteria is met.

46. A system for facilitating commerce within a social network platform, the system comprising:
one or more computer auction engines, each computer auction engine being associated with a potential seller of goods and/or services; and
an application server of one or more computer processors comprising an auction controller and communication server in communication with the computer auction engines, wherein the application server operates software stored on a computer-readable non-transient medium:
receive an electronic message originating after a subscriber of a social network platform interacts with the social network platform through a client computing device, the message including auction parameters of a desired purchase;
provide the auction parameters to the one or more computer auction engines;
receive, from at least a subset of the one or more computer auction engines, offers to fulfill the desired purchase for the subscriber, wherein each received offer comprises updated auction parameters programmatically calculated by one of the one or more computer auction engines operating software stored on a computer-readable non-transient medium, the offers increasingly favorable to the subscriber until a single computer auction engine has provided a most favorable set of auction parameters;
distribute, after commencing purchase by the initiating subscriber at the most favorable set of auction parameters, over an electronic network the most favorable set of auction parameters to additional client computing devices of additional subscribers of the social network platform, thus allowing the additional subscribers to complete a purchase according to the most favorable set of auction parameters; and
determine the additional subscribers of the social network platform to whom the most favorable set of auction parameters are distributed.

47. The system of claim 46 wherein the application server further operates software to receive a message originating after the subscriber interacts with the social network platform through the client computing device, the message indicating a desire to complete the desired purchase at the most favorable set of auction parameters.

48. The system of claim 46 wherein the computer auction engine providing the most favorable set of auction parameters further operates software to limit the duration during which the additional subscribers may complete a transaction.

49. The system of claim 46 wherein the computer auction engine providing the most favorable auction parameters further operates software to limit an available inventory allocated to purchase by the additional subscribers.

50. The system of claim 49 wherein the application server further operates software to limit the degree of separation between the subscriber and the additional subscribers.

51. The system of claim 46 wherein the application server further operates software to receive messages from a subset of the additional subscribers indicating a desire to complete the desired purchase at the most favorable set of auction parameters.

52. The system of claim 46 wherein the computer auction engines further operate software to programmatically calculate the respective updated auction parameters based on a respective seller-specific objective function.

53. The system of claim 52, wherein at least one of the computer auction engines further operates software to constrain the seller-specific objective function by one or more of: an actual inventory level; target inventory level; supplier break; actual revenues revenue target; actual profit; promotional cost; advertising cost; customer acquisition cost; and profit target.

54. The system of claim 46 wherein the application server further operates software to access a consumer profile of the subscriber from the social network platform and provide the consumer profile to the computer auction engines such that the programmatically-calculated updated auction parameters are based, at least in part, on the consumer profile.

55. The system of claim 54 wherein the application server further operates software to identify the additional subscribers from members of the subscriber's community within the social network platform, and to base the consumer profile to include a community profile derived from consumer profiles attributed to the additional subscribers in the subscriber's community.

56. The system of claim 55 wherein the application server further operates software to calculate an index based, at least in part, on one or more of: the additional subscribers' age; income; education; gender; location; historical purchase patterns; sales conversion rate; and activity level within the social network platform.

57. The system of claim 55 wherein the application server operating software to determine the additional subscribers further comprises operating software to include, in the additional subscribers, all members of a group formed before transmitting the initial auction parameters; and wherein the electronic message including initial auction parameters includes identification of the group.

58. The system of claim 55 wherein the computer auction engine providing the most favorable set of auction parameters further operates software to use the community profile, at least in part, to determine an inventory available for completion by the additional subscribers.

59. The system of claim 54 wherein one or more of the computer auction engines further operates software to programmatically calculate its respective updated auction parameters based on a respective seller-specific objective function which considers the consumer profile.

60. The system of claim 54 wherein the application server operating software to provide a consumer profile further comprises operating software to derive the consumer profile based, at least in part, on the size of the subscriber's community within the social network platform.

61. The system of claim 54 wherein the application server operating software to provide a consumer profile further comprises operating software to base the consumer profile to include a community profile derived from individual profiles of members in the subscriber's community.

62. The system of claim 46 wherein the application server further operates software to provide to the client computing device of the subscriber and each of the additional computing devices of the additional subscribers an electronically rendered screen comprising one or more of: the auction parameters; the updated auction parameters; and the most favorable set of auction parameters.

63. The system of claim 46, wherein the application server further operates software to facilitate search of the desired purchase or of the most favorable set of auction parameters by other subscribers to join the additional subscribers receiving the most favorable set of auction parameters.

64. The system of claim 46, wherein the computer auction engine providing the most favorable set of auction parameters further operates software to limit a duration during which the additional subscribers may complete the purchase and/or an inventory still available for completing purchase by the additional subscribers, and the application server further operates software to distribute to the additional computing devices of the additional subscribers the duration remaining and/or inventory still available for completing purchase by the additional subscribers.

65. The system of claim 64, wherein the computer auction engine providing the most favorable set of auction parameters further operates software to base the duration remaining and/or inventory still available on a common pool subject to, at least in part, the additional subscribers completing purchase and/or other transactions and/or expected conversions of outstanding offers separate from the most favorable set of auction parameters.

66. The system of claim 64, wherein the computer auction engine further operates software to update the duration remaining and/or inventory still available for completing purchase by the additional subscribers every time any transaction occurs.

67. The system of claim 46, wherein the application server further operates software to to provide one or more of reviews and comments about the purchase available for completion to the additional computing devices of the additional subscribers.

68. The system of claim 46, wherein the application server further operates software to integrate with micro-blogging sites for distributing, accessing, and/or responding to the most favorable set of auction parameters.

69. The system of claim 46, wherein the application server further operates software to enable configuration of one or more filters for a filtering subscriber to identify or prevent if a potential purchase is presented to the filtering subscriber.

70. The system of claim 69, wherein the application server further operates software to generate a text message to the filtering subscriber.

71. The system of claim 46, wherein the application server further operates software to distribute from the computer auction engine providing the most favorable set of auction parameters, the message with information or up-sell or cross-sell offers to at least one of the subscribers who views the most favorable set of auction parameters.

72. The system of claim 46 wherein at least one of the computer auction engines further operates software to optimize the updated auction parameter calculation factoring other transactions and/or offers completed and/or pending.

73. The system of claim 46 wherein the initial parameters include a dream price, received updated auction parameters include a price at which the respective seller is willing to fulfill the desired purchase, and the application server further operates software to identify as the most favorable set of auction parameters and consider no further received offers after receiving an updated set of auction parameters wherein the price matches or betters the dream price.

74. The system of claim 46, wherein the application server further operates software to distribute targeted, personalized advertisements from one or more of the computer auction engines to at least one of the client computing devices.

75. The system of claim 74, wherein the identification of the subscribers who are served targeted, personalized advertisements is based on expected benefit to the respective seller.

* * * * *